United States Patent [19]

McCoy et al.

[11] Patent Number: 6,018,739
[45] Date of Patent: Jan. 25, 2000

[54] BIOMETRIC PERSONNEL IDENTIFICATION SYSTEM

[75] Inventors: Mike McCoy, Herndon; Kim-Ying Chu, Fairfax, both of Va.; James M. Annulis, Baltimore, Md.

[73] Assignee: Raytheon Company, Lexington, Mass.

[21] Appl. No.: 08/857,112

[22] Filed: May 15, 1997

[51] Int. Cl.[7] .................................................. G06F 17/00
[52] U.S. Cl. ................................ 707/102; 707/104; 707/6
[58] Field of Search .................................. 235/382, 379, 235/380; 340/825.21, 825.31; 382/116, 117, 115, 124, 181, 125; 707/104, 2, 6, 102, 103; 356/71; 359/561; 380/24, 23, 51

[56] References Cited

U.S. PATENT DOCUMENTS

| | | | |
|---|---|---|---|
| 4,554,591 | 11/1985 | Kee | 358/256 |
| 4,805,223 | 2/1989 | Denyer | 382/4 |
| 4,843,377 | 6/1989 | Fuller et al. | 340/573 |
| 5,214,574 | 5/1993 | Chang | 361/393 |
| 5,245,329 | 9/1993 | Gokcebay | 340/825.21 |
| 5,291,560 | 3/1994 | Daugman | 382/117 |
| 5,337,043 | 8/1994 | Gokcebay | 340/825.31 |
| 5,359,669 | 10/1994 | Shanley et al. | 382/6 |
| 5,368,104 | 1/1995 | Sime | 235/379 |
| 5,420,936 | 5/1995 | Fitzpatrick et al. | 382/124 |
| 5,457,747 | 10/1995 | Drexler et al. | 380/24 |
| 5,467,403 | 11/1995 | Fishbine et al. | 382/116 |
| 5,485,312 | 1/1996 | Horner et al. | 359/561 |
| 5,513,272 | 4/1996 | Bogosian, Jr. | 382/116 |
| 5,546,943 | 8/1996 | Gould | 128/653.1 |
| 5,566,327 | 10/1996 | Sehr | 707/104 |
| 5,608,387 | 3/1997 | Davies | 340/825.34 |
| 5,613,012 | 3/1997 | Hoffman et al. | 382/115 |
| 5,615,277 | 3/1997 | Hoffman | 382/115 |
| 5,633,782 | 5/1997 | Goodman et al. | 361/683 |
| 5,648,648 | 7/1997 | Chou et al. | 235/382 |
| 5,659,626 | 8/1997 | Ort et al. | 382/125 |
| 5,664,207 | 9/1997 | Crumpler et al. | 395/766 |
| 5,764,789 | 6/1998 | Pare, Jr. et al. | 382/115 |
| 5,799,098 | 8/1998 | Ort et al. | 382/125 |
| 5,815,252 | 9/1998 | Price-Francis | 356/71 |
| 5,822,181 | 10/1998 | Jung | 361/683 |
| 5,838,812 | 11/1998 | Pare, Jr. et al. | 382/115 |
| 5,845,005 | 12/1998 | Setlak et al. | 382/124 |
| 5,869,822 | 2/1999 | Meadows, II et al. | 235/380 |

OTHER PUBLICATIONS

Khanna et al., Automated Fingerprint Identification System (AFIS) Benchmarking Using the National Institute of Standards and Technology (NIST) Special Database 4, IEEE, Apr. 1994, pp. 188–194.

Akhan et al., "A Flexible Fingerprint Identification System", IEEE, May 16–18, 1995, pp. 284–287.

Lynch et al., "Applications of Linear Weight Neural Networks to Fingerprint Recognition", IEEE, Jun. 26–28, 1995, pp. 139–142.

Ratha et al., An FPGA–based Point Pattern Matching Processor with Application to Fingerprint Matching, IEEE, Mar. 1995, pp. 394–401.

Jain et al., "On–Line Fingerprint Verification", IEEE, 1996, pp. 596–600.

Ratha et al., "A Real–Time Matching System for Large Fingerprint Databases", IEEE, 1996, pp. 799–813.

*Primary Examiner*—Wayne Amsbury
*Assistant Examiner*—Thuy N. Pardo
*Attorney, Agent, or Firm*—Baker & Botts, L.L.P.

[57] ABSTRACT

A distributed biometric identification system and architecture for rapidly identifying individuals using fingerprint and photographic data. The present architecture includes a centralized server coupled to a plurality of distributed client workstations by way of a wide area telecommunications network. The server and client workstations each contain subsystems that cooperate to provide personnel identification services to users of the system. The distributed biometric identification system is designed to rapidly identify personnel based on the use of biometric (i.e., fingerprint or photograph) or other unique identification data. The system is an integrated, front-end automated fingerprint and photographic identification tool that supports comprehensive application processing and administrative systems, such as those of the INS and other government agencies.

6 Claims, 16 Drawing Sheets

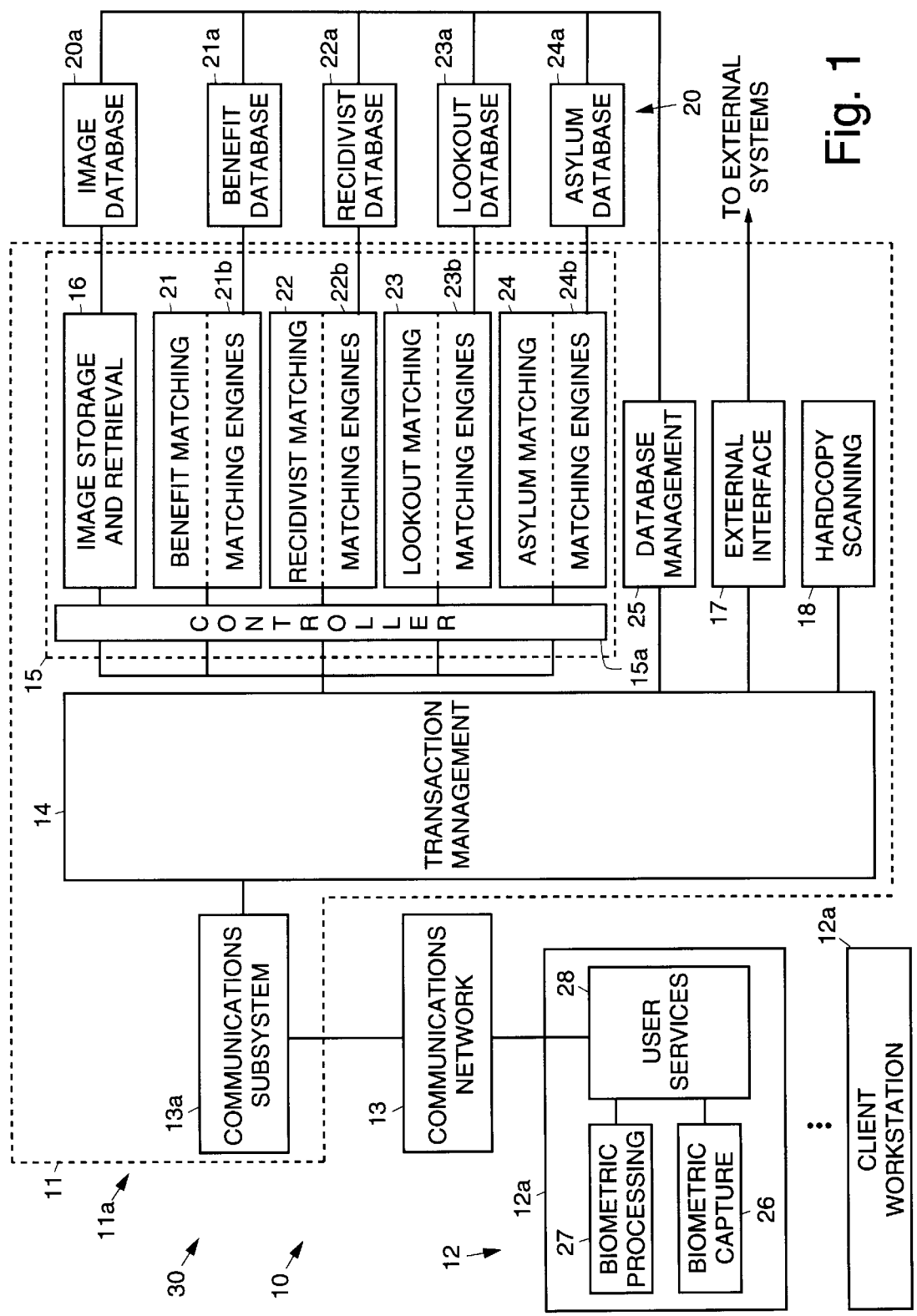

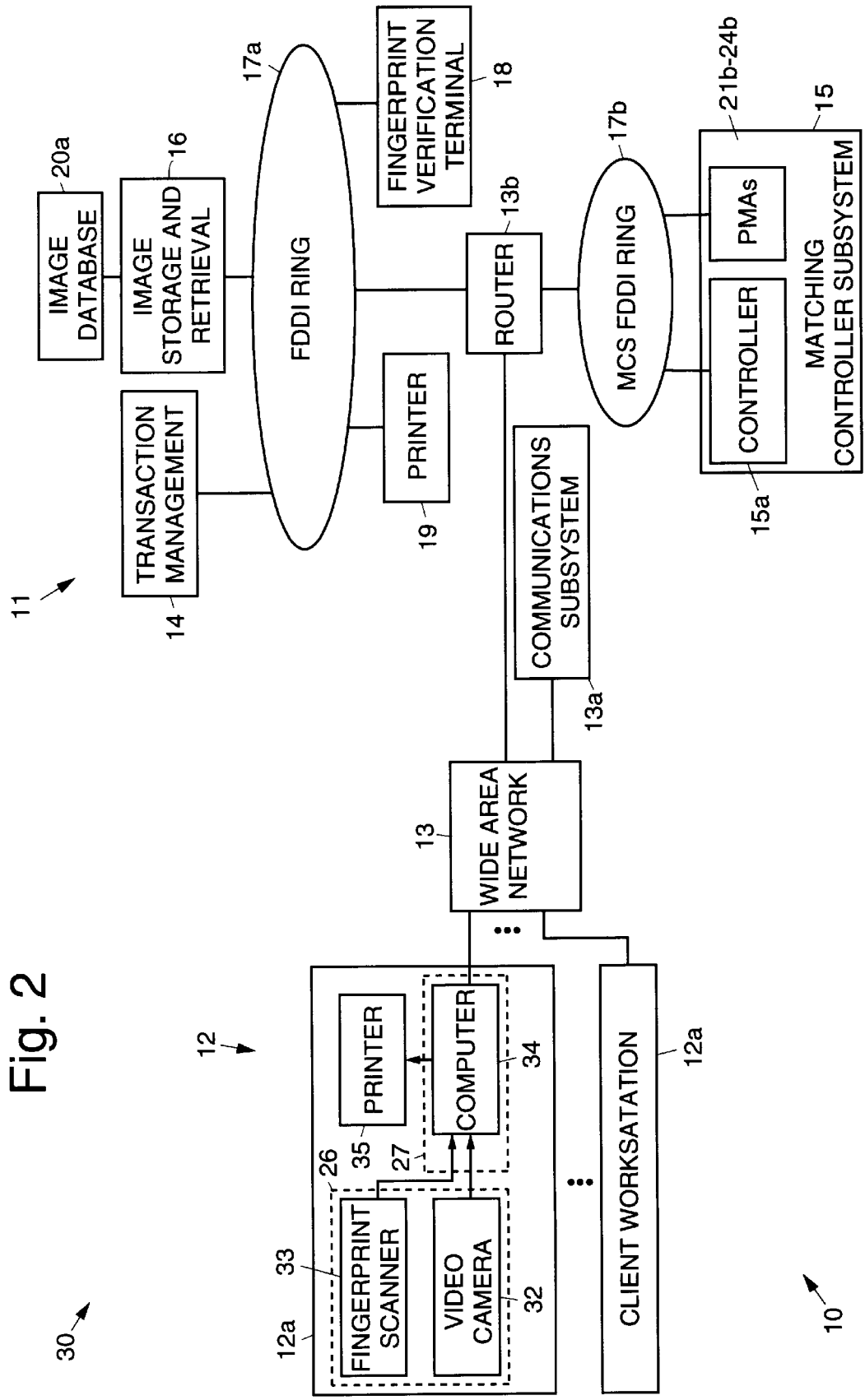

BIOMETRIC PERSONNEL IDENTIFICATION SYSTEM

BACKGROUND

The present invention relates generally to identification systems, and more particularly, to a distributed biometric, fingerprint- and photograph-based, identification system for identifying individuals.

In the past, identification of individuals that are processed by the Immigration and Naturalization Service (INS) or other governmental agencies, for example, has been a relatively slow process. Although many governmental agencies maintain large databases containing fingerprints, photographs, and other relevant data pertaining to individuals that use the services of the respective agencies, heretofore, no system has been available to quickly search and retrieve information relating to identification and interaction with these individuals. The present invention is designed to fulfill this need.

More specifically, the INS interacts with and is required to identify millions of persons each year, including immigration law violators, immigration benefit applicants, individuals requesting asylum, travelers, and visitors to the United States. Many encounters are processed under severe time constraints and, prior to the present invention, with insufficient access to relevant information.

Accordingly, it is an objective of the present invention to provide for a distributed biometric identification system. It is a further objective of the present invention to provide for a distributed biometric identification system that identifies individuals using selected fingerprint and photographic data.

SUMMARY OF THE INVENTION

To meet the above and other objectives, the present invention provides for a distributed biometric identification system and architecture for rapidly identifying individuals using fingerprint and photographic data. The present invention comprises an architecture that includes a centralized server and a plurality of distributed client workstations. The centralized server and client workstations are connected by way of a wide area telecommunications network to form a client/server architecture. The centralized server and client workstations each contain subsystems that cooperate to provide personnel identification services to users of the system.

More particularly, the distributed biometric identification system comprises a plurality of client workstations, a centralized server that is remotely located from the client workstations, and a wide area telecommunications network interconnecting the client workstations to the server. The centralized server comprises a transaction management subsystem, a database for storing fingerprint minutiae of individuals that are of interest to users of the system, a matching controller subsystem coupled between the transaction management subsystem and the database for matching fingerprints of individuals to fingerprints stored in the database, and an image storage and retrieval subsystem for storing and retrieving electronic images of the fingerprints and photographic images of individuals.

The client workstations and the server cooperate to rapidly and accurately compare fingerprints of an individual against previously obtained fingerprints stored in the fingerprint database, and to store, update, and retrieve photographic images associated with the individuals that have been previously stored in the photograph database for comparison with a photographic taken of the individual at the time of the encounter.

The distributed biometric identification system is designed to rapidly identify personnel based on the use of biometric (i.e., fingerprint or photograph) or other unique identification data. The distributed biometric identification system also integrates with other computer systems and enables available information on an individual to be retrieved in support of any application process requiring quick and accurate identification of an individual. The distributed biometric identification system is an integrated, front-end automated fingerprint and photographic identification tool that supports comprehensive application processing and administrative systems, such as those of the INS and governmental agencies.

The distributed biometric identification system is designed and engineered as a one- or two-fingerprint identification system that incorporates photograph verification to address various personnel identification requirements, such as rapid screening of individuals, identity checks using biometric or other unique identification data, and benefit applicant verification and authentication.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates an architecture for a distributed biometric identification system in accordance with the principles of the present invention;

FIG. 2 illustrates an exemplary embodiment of an operational distributed biometric identification system in accordance with the principles of the present invention.

DETAILED DESCRIPTION

Figure 3A:
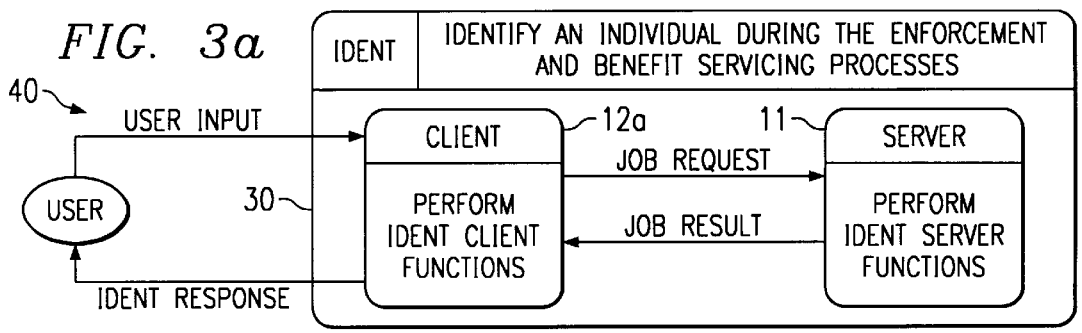
FIGS. 3a–3t illustrate data flow diagrams representative of the data processing performed in the present distributed biometric identification system and architecture.

Referring to the drawing figures, FIG. 1 illustrates an architecture 10 of a distributed biometric personnel identification system 30 in accordance with the principles of the present invention. The architecture 10 of the distributed biometric personnel identification system 30 includes a centralized server 11 comprising a transaction management subsystem 14, a matching subsystem 15, a database management subsystem 25, a communications subsystem 13a, and an image storage and retrieval subsystem 16 that is coupled to a plurality of distributed clients 12 comprising a plurality of client workstations 12a. The server 11 and client workstations 12a are interconnected by way of a wide area telecommunications network 13 to form the distributed biometric personnel identification system architecture 10. The server 11 and client workstations 12a each comprise distinct subsystems that work together to provide personnel identification services to users of the system 30.

The particular system 30 described herein was developed to support enforcement and benefit processing practices of the Immigration and Naturalization Service, and is exemplary of one of many possible systems 30 that may embody the principles of the present invention. However, the present invention is not limited to this particular system 30, and may be readily adapted to provide identification services for other organizations or for use in other applications requiring quick and accurate identification of an individual.

The server 11 and its subsystems 14, 15, 16, 25, 13a are typically located at a remote location relative to the client workstations 12a and provides a centralized source of identification support to dispersed users that operate the client workstations 12a. The subsystems, working in unison, properly route the transaction to one or more of the matching subsystems (lookout, recidivist, asylum, and/or benefits) and rapidly and accurately compare fingerprints of individuals submitted by the client workstations against previously obtained fingerprints stored in one or more fingerprint databases 20. Subsystems are also provided that store, update, and retrieve electronic images of fingerprints and photographic images of individuals that have been previously processed that are stored in an image database 20a for comparison with digitized photographs taken of the individuals encountered at the client workstations.

As mentioned above, the server 11 is an integration of a number of subsystems, including the transaction management subsystem 14, the matching controller subsystem 15, the communications subsystem 13a, and the image storage and retrieval subsystem 16. The server 11 also contains a hardcopy scanning subsystem 18, and an external interface 17 that interfaces with external systems. System and database administration services are provided by the database management subsystem 25. The communications subsystem 13a is used to allow clients to access (log in) to the server 11 from their client workstations 12a, and provides an interface to the transaction management subsystem 14 using a database link.

The matching controller subsystem 15 provides fingerprint matching capabilities, and enables users of the system 30 to conduct cold (one-to-many) searches or verification (one-to-one) searches in user-selected fingerprint databases 20. The matching controller subsystem 15 interfaces between the transaction management subsystem 14 and a plurality of logical and/or physical fingerprint databases 20, that each have individual interfaces. The matching controller subsystem 15 comprises a matching controller 15a that is coupled to a recidivist matching subsystem 21, a lookout matching subsystem 22, an asylum matching subsystem 23, and a benefit matching subsystem 24. The matching controller 15a communicates with each matching subsystem 21–24, and interfaces with fingerprint matching hardware and software associated with each of the specific matching subsystems 21–24. Each of the respective matching subsystems 21–24 are coupled to separate fingerprint databases 21a, 22a, 23a, 24a, respectively. The fingerprint databases 21a, 22a, 23a, 24a contain fingerprint minutiae related to individuals of interest to users of the system 30.

The benefit matching subsystem 21 verifies the identity of individuals encountered during the benefit servicing process to approve or deny applications or petitions for immigration benefits, for example. The benefit matching subsystem 21 comprises a benefit matching workstation 21 having a plurality of benefit matching engines 21b that rapidly searches and verifies individuals in the benefits database 21a. The benefit matching workstation 21 may be a Hewlett-Packard (HP) UNIX workstation 22 configured with an HP-UX version 10 operating system, for example, while the benefit matching engines 21b are fingerprint matcher boards that plug into the benefit matching workstation 21.

The recidivist matching subsystem 22 provides the capability to identify individuals who have attempted to enter the United States illegally on multiple occasions. The recidivist matching subsystem 22 comprises a recidivist workstation 22 having a plurality of recidivist matching engines 22b that enable users to rapidly search the recidivist database 22a.

The recidivist workstation 22 may be a Hewlett-Packard (HP) UNIX workstation 22 configured with an HP-UX version 10 operating system, for example, while the recidivist matching engines 22b are fingerprint matcher boards that plug into the recidivist workstation 22.

The lookout matching subsystem 23 provides the capability to quickly identify encountered individuals with criminal records on file with the Immigration and Naturalization Service or who are considered to be "lookouts" posing potential threats to the health and safety of border patrol personnel. The lookout matching subsystem 23 comprises a lookout matching workstation 23 having a plurality of lookout matching engines 23b that rapidly search and identify individuals in the lookout (criminal) database 23a. The lookout workstation 23 and its software and functionality are substantially identical to the recidivist workstation 22 described above. The lookout matching engines 23b are fingerprint matcher boards that plug into the lookout matching workstation 23.

The asylum matching subsystem 24 verifies the identity of individuals encountered during an asylum application process to effectively detect and reduce immigration fraud. The asylum matching subsystem 24 comprises an asylum matching workstation 24 having a plurality of asylum matching engines 24b that rapidly searches and verifies individuals in the asylum database 24a. The asylum matching workstation 24 may be a Hewlett-Packard (HP) UNIX workstation 24 configured with an HP-UX version 10 operating system, for example, while the asylum matching engines 24b are fingerprint matcher boards that plug into the asylum matching workstation 24.

The image storage and retrieval subsystem 16 includes hardware and software that provides the system 30 with local repository services to store and retrieve digitized, compressed fingerprint, photographic images of the face, and other images. Photographs and fingerprint images are stored using Joint Photographic Experts Group (JPEG) or Wavelet Scalar Quantization (WSQ) compression algorithms, respectively. The compression ratio for fingerprint images is 15:1 while photographic images of the faces and other photographs are stored at a 35:1 ratio. The image storage and retrieval subsystem 16 may be an HP UNIX workstation that controls mass storage devices such as RAID and optical-based storage systems, for example.

The image storage and retrieval subsystem 16 interfaces with the transaction management subsystem 14 to provide repository services, including records addition, retrieval, update, and deletion within INS-maintained data files, for example. Files that are processed by the image storage and retrieval subsystem 16 include photographic images of the face, scars, marks, tattoos, and fingerprint image data files stored in the lookout database 23a; photographic images of the face and fingerprint image data files stored in the asylum database 24a; photographic images of the face, scars, marks, tattoos, and fingerprint image data files stored in the recidivist database 22a; and photographic images of the face and fingerprint image data files stored in the benefits database 21a.

The transaction management subsystem 14 provides process management functionality and includes the hardware and software to coordinate system and user transactions, scheduling, routing, synchronization, and execution (search, enroll and verification). The transaction management subsystem 14 may comprise an HP workstation running HP-UX Version 10 operating system.

As shown in FIG. 1, the transaction management subsystem 14 provides an interface between the client workstations 12a and the various subsystems 14, 15, 16, 25, 13a of the server 11. Specifically, the transaction management subsystem 14 processes transaction requests made at the client workstations 12a and dispatches those requests to the appropriate subsystem of the server 11 and then tracks the requests. In addition, the transaction management subsystem 14 also provides database transaction and system management functionality to ensure database concurrency, synchronization, and efficient load balancing of system resources.

The external interface 17 includes hardware and software that facilitates authorized system access by authorized external systems. It serves as an interface between the system 30 and external systems that submit American National Standards Institute (ANSI) standards records to the system 30 for processing. The hardcopy scanning element 18 includes hardware and software that facilitates the capture and conversion of large amounts of biometric data generated at the server 11.

The client workstations 12a enable users to submit identification-related service requests to the system 30. Requests may include searching, adding an individual to a database 20 and capturing and processing biometric data, such as obtaining fingerprints of the individual, taking a digitized photograph of the individual, compressing data or extracting fingerprint minutiae, for example. The subsystems that comprise the client workstations 12a are described below, including the user service subsystem 28, biometric capture subsystem 26, and biometric processing subsystem 27.

The client workstations 12a comprise a plurality of computer terminals that are distributed at remote locations, such as border patrol stations, district and asylum offices, INS service centers, INS field offices, and other INS facilities, for example. The client workstations 12a enable dispersed users to submit identification-related service requests to the server 11 and obtain the desired services.

The client workstations 12a include hardware and software that provide identification services to users. Each client workstation 12a may comprise a Pentium-based personal computer configured with Windows operating system software, for example. The client workstation 12a has a user-friendly and intuitive graphical user interface using Oracle Forms software, and a Structured Query Language (SQL) based, client-server, front end query tool. The client workstation 12a displays menu-driven screens from which users may select specific functions (such as search and enroll, search only, and verify functions) that are to be performed by the system 30. These screens also allow users to indicate preferential modes of operation that permit foreground or background searches to be conducted. The foreground search mode allows users to obtain immediate search results. The background search mode allows users to submit multiple search requests while obtaining delayed system responses.

The biometric capture subsystem 26 comprises hardware and software that enables users to capture photographic images of the face and fingerprint images from rolled ink impression conversion or directly from pressed finger scans. The biometric capture subsystem 26 includes a video camera, high-speed flatbed and single print scanners, and a video frame grabber.

The biometric processing subsystem 27 integrates hardware and software from multiple vendors that performs fingerprint compression and fingerprint minutiae extraction. The biometric processing subsystem 27 may also be made part of the server 11 depending on centralized minutiae extraction needs required by users of the system 30.

For the purposes of example, the system 30 may include the following components used that implement the respective subsystems. The transaction management subsystem 14 may comprise two HP Series 800 workstations. The image storage and retrieval subsystem 16 may comprise two HP Series 800 workstations, a RAID storage disk, and an optical disk jukebox.

With regard to the matching controller subsystem 15, the benefits matching subsystem 21 may comprise two HP Series 800 workstations that are used as verification servers. The recidivist matching subsystem 22 may comprise one or more HP Series 800 workstations that are used as the controllers, and one or more HP Series 700 Workstations that are used to perform fingerprint matching. The lookout matching subsystem 23 may comprise six HP Series 800 workstations used as the controllers, and eighteen HP Series 700 workstations used to perform fingerprint matching. The asylum matching subsystem 24 may comprise two HP Series 800 workstations that are used as verification servers.

The user services subsystem 28 of each client workstation 12a may comprise a Pentium-based PC terminal, for example. The biometric capture subsystem 26 of each client workstation 12a may comprise a scanner manufactured by Identix, a video camera manufactured by Video Labs, and a frame grabber manufactured by Matrox. The biometric processing subsystem 27 of each client workstation 12a may comprise one or more minutiae extraction (pattern matching) boards manufactured by Cogent or Printrak, for example.

The Cogent pattern matching accelerator boards, for example, are high-speed fingerprint image characteristic matchers that implement command, control and data flow computing. Based on an advanced super pipeline, super parallel design architecture and a new generation field-programmable gate array, a server having four pattern matching accelerators, for example, delivers up to 160 giga-operations per second of computing power while absorbing up to 40 megabytes per second (peak) of data from high-speed dual input/output channels. The Cogent pattern matching accelerators perform at 100,000 fingerprint characteristic matches per second or 50,000 persons per second, based on a two-fingerprint open search.

The matching controller subsystem 15 is designed for fault-tolerant operation, and has two identical hardware sets, each having one to four programmable matching accelerator boards, a RISC single-board computer, a high speed input/output processor board, and multiple 2-gigabyte fast-wide SCSI disk drives. Each hardware set of the matching controller subsystem 15 maintains mirrored databases 20 containing minutiae maps used to perform fingerprint matching. The mirrored configuration allows the matching controller subsystem 15 to perform simultaneous search transactions and ensure data security.

Referring to FIG. 2, it depicts an exemplary system 30 that includes a server 11 coupled to a distributed set of client workstations 12a by way of a wide area communications network 13. The server 11 comprises a Fiber Distributed Data Interface (FDDI) ring 17a that interconnects the transaction management subsystem 14, the image storage and retrieval subsystem 16, the fingerprint verification subsystem 18 and a printer 19. The FDDI ring 17a is a 100 Mbps Local Area Network, defined by ANSI and OSI standards. The FDDI ring 17a was originally designed to operate over fiber optic cabling, but also includes standard copper media for interconnection. The FDDI ring 17a uses a token ring media access control protocol. A router 13b interconnects a matching control subsystem (MCS) FDDI ring 17b to the FDDI ring 17a and also connects the wide area network 13 to the FDDI ring 17a. The communications subsystem 13a may be connected to the wide area network 13 and communicates with the transaction management subsystem 14 by way of the router 13b and FDDI ring 17a. The MCS FDDI ring 17b interconnects the matching controller 15a to the plurality of pattern matching accelerators 21b, 24b.

The communication architecture and protocol relationships used to communicate between the server 11 and the client workstations 12a are conventional. For example, the client workstations 12a may use TCP/IP communication protocols along with Ethernet, token ring and 10Base-T networks, for example. The wide area network 13 may use a T1 connection or 56 Kbps data rate connection for communicating between the client workstations 12a and the router 13b, for example. The server subsystems may communicate with the router 13b over a 10Base-T Ethernet link using TCP/IP protocols, for example.

The fingerprint verification subsystem 18 comprises a set of computer terminals that are used by operators to visually verify that two or more sets of fingerprints belong to the same individual. The fingerprint verification subsystem 18 is used in cases where the automated fingerprint matching process does not produce a definite "match" or "no match" result at a certain threshold of minutiae commonality. The fingerprint verification subsystem 18 may be hosted on one or more HP workstations, for example, and use software utilized by the pattern matching accelerators 21b, 24b.

Figure 3B:
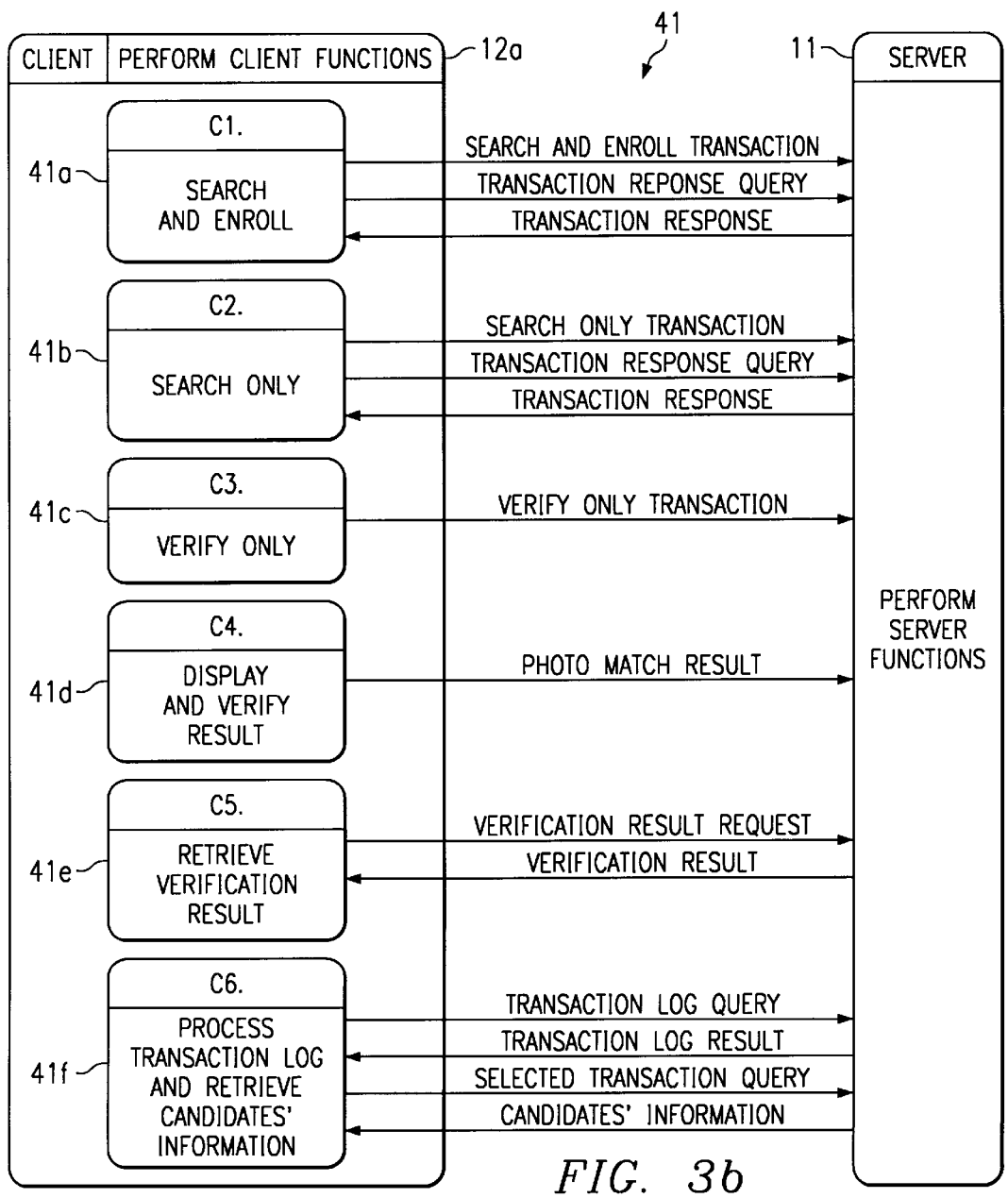
Figure 3C:
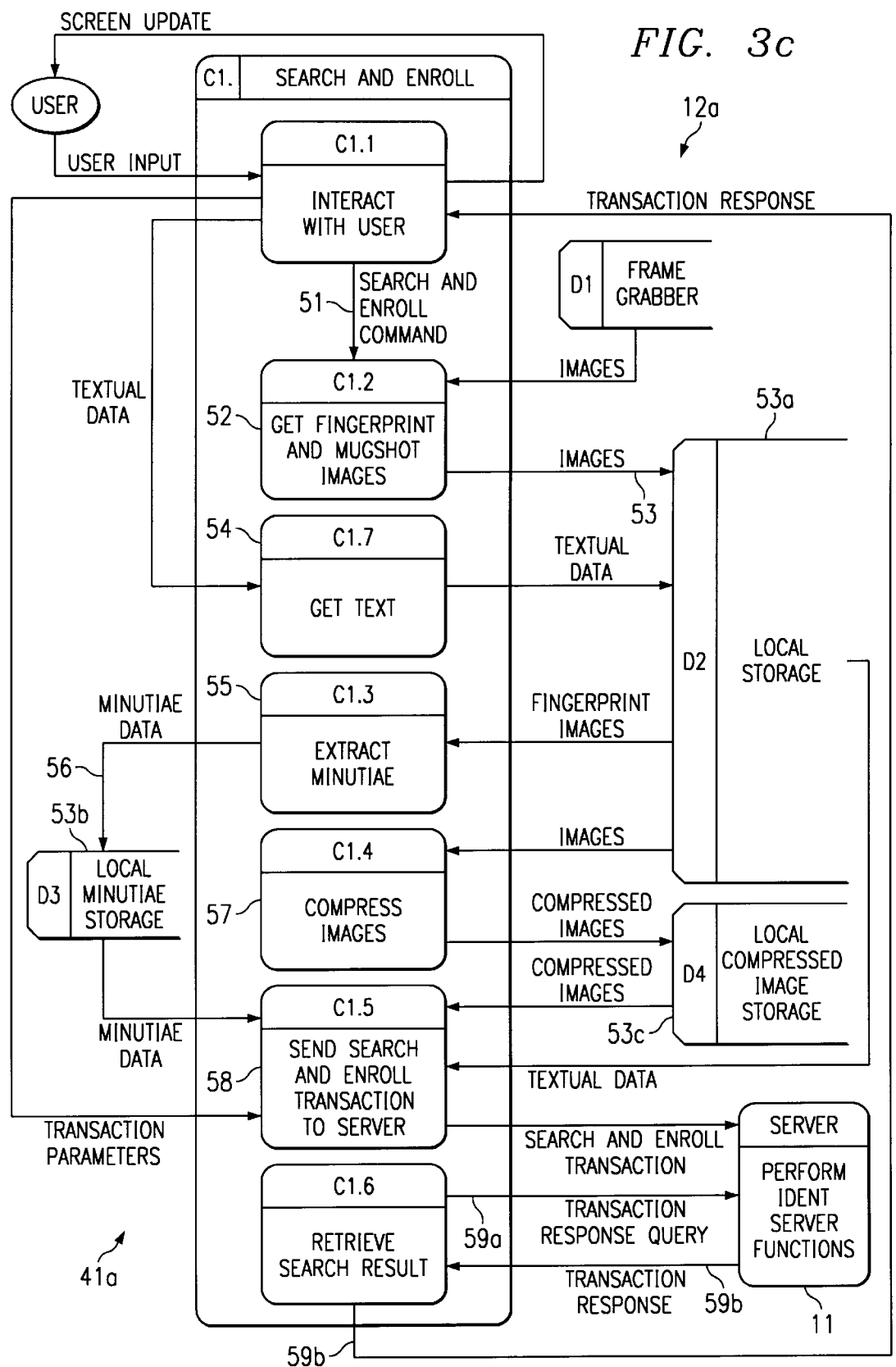
Figure 3D:
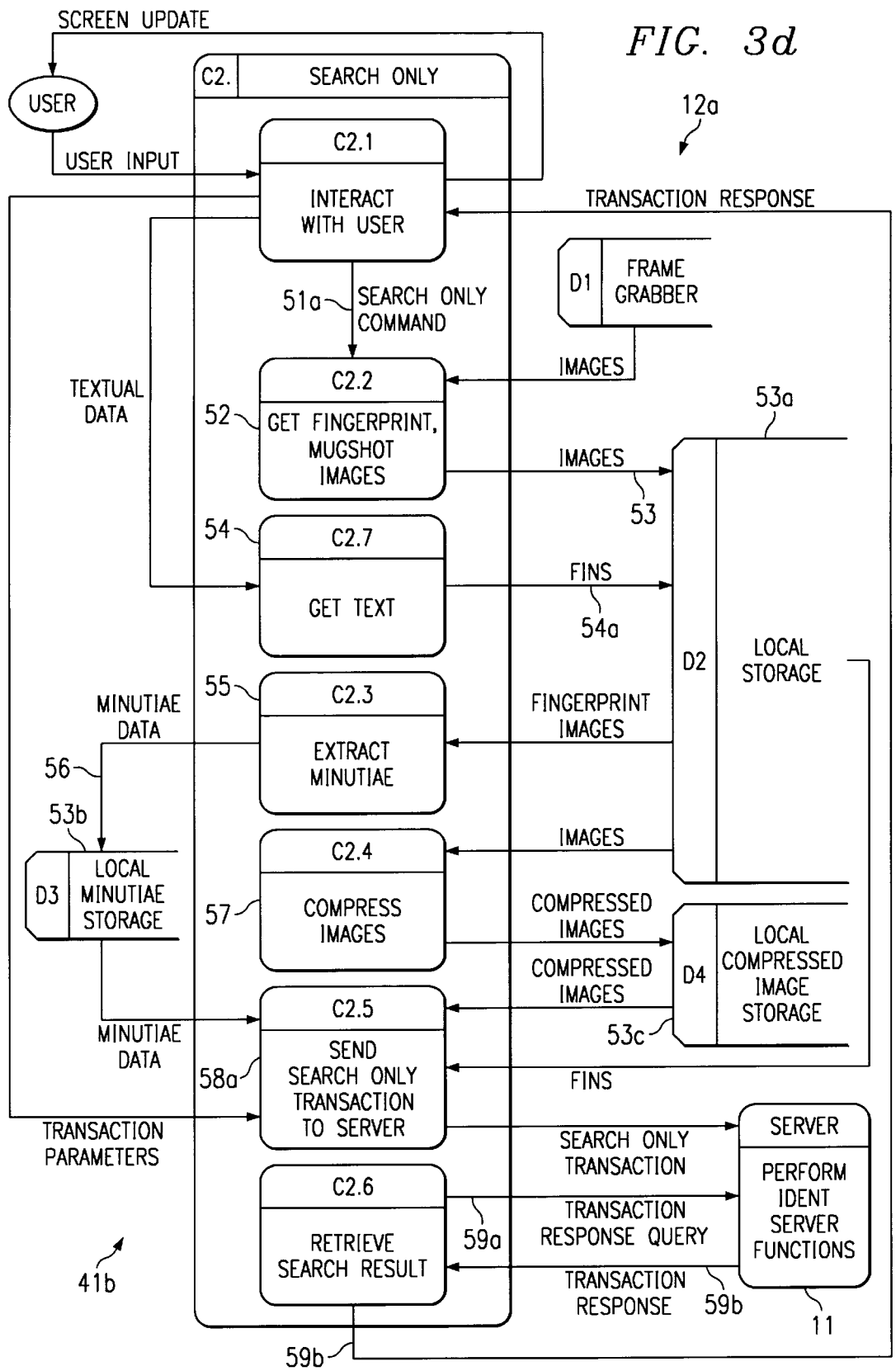
Figure 3E:
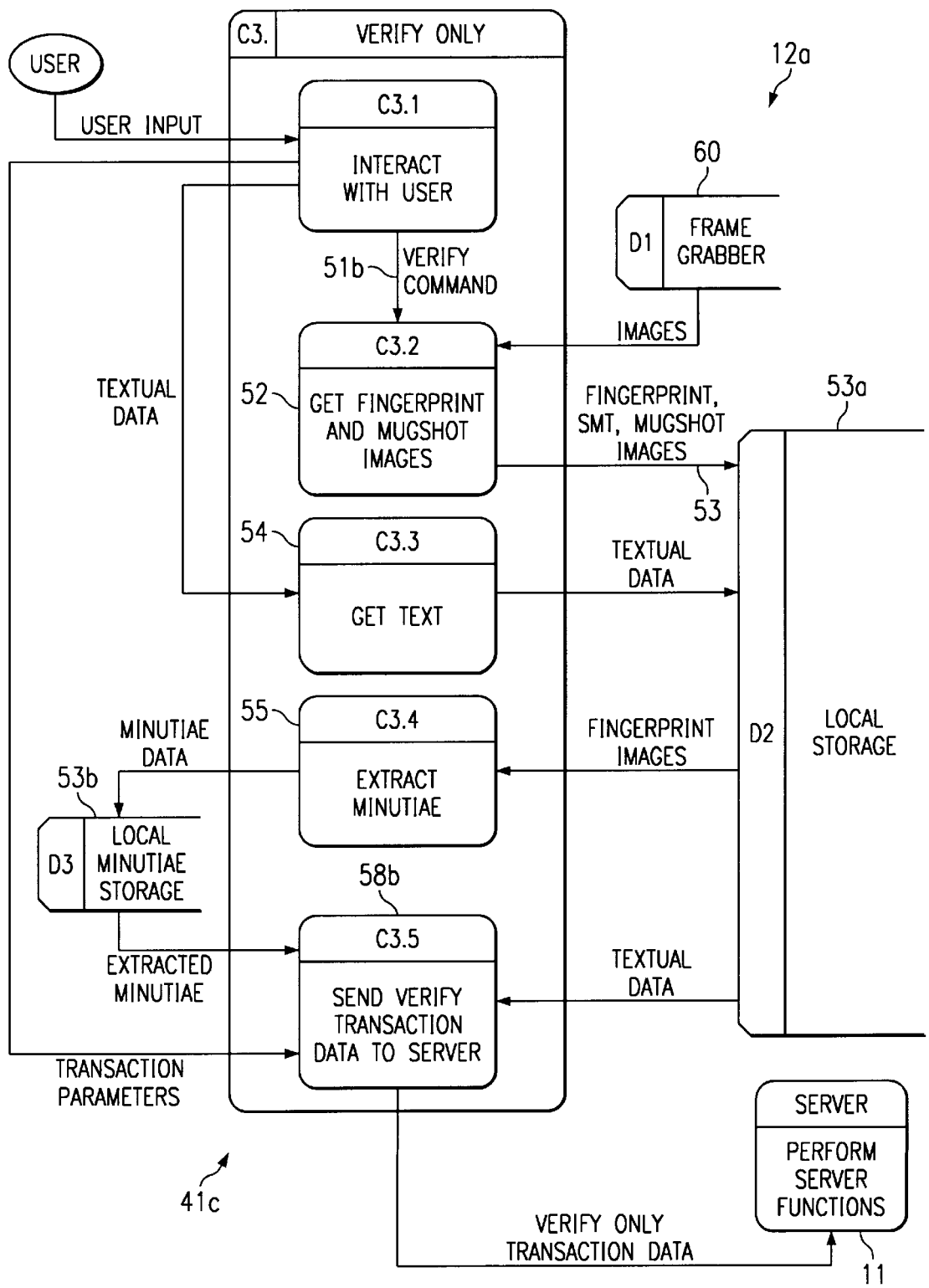
Figure 3F:
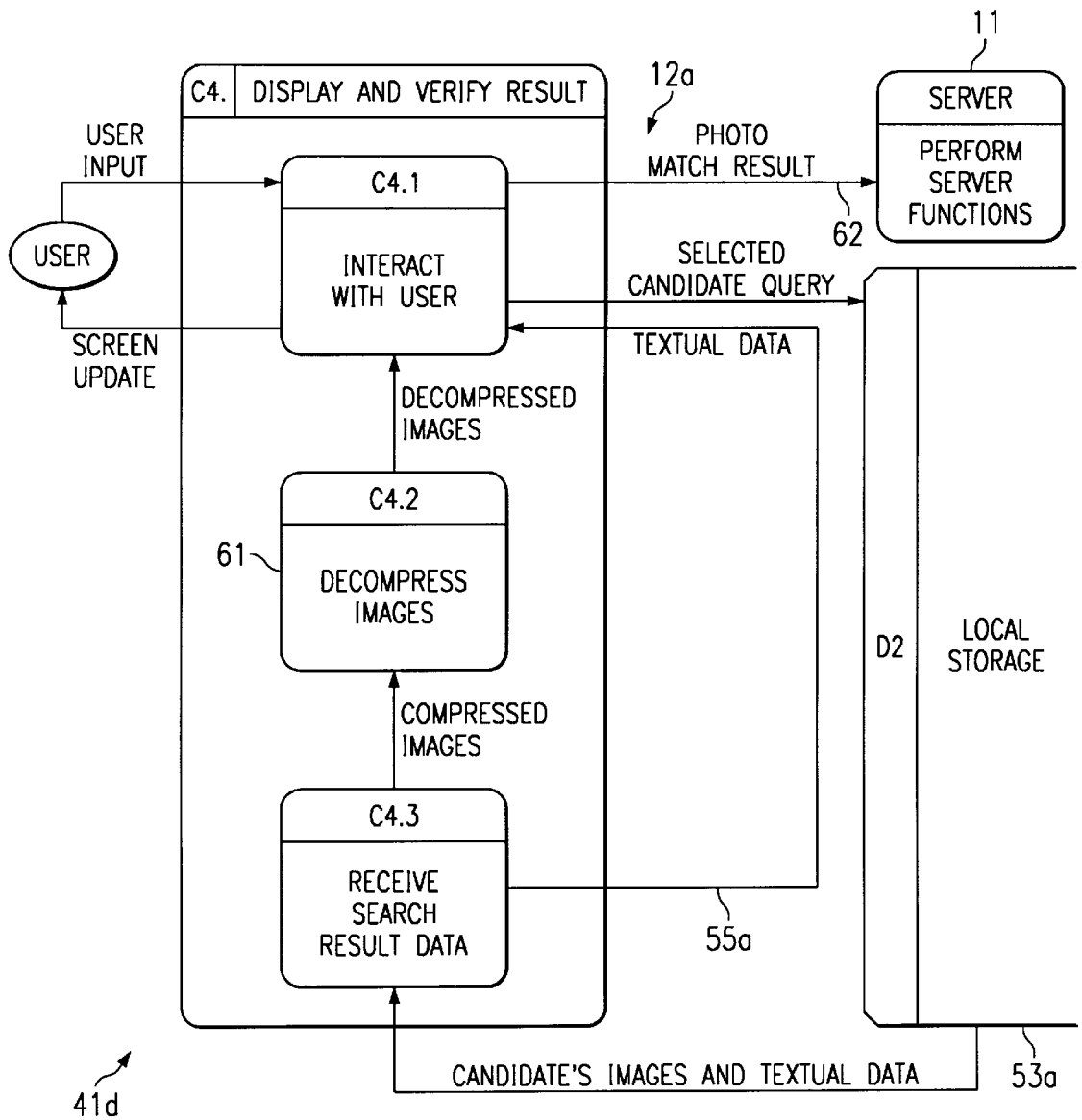
Figure 3G:
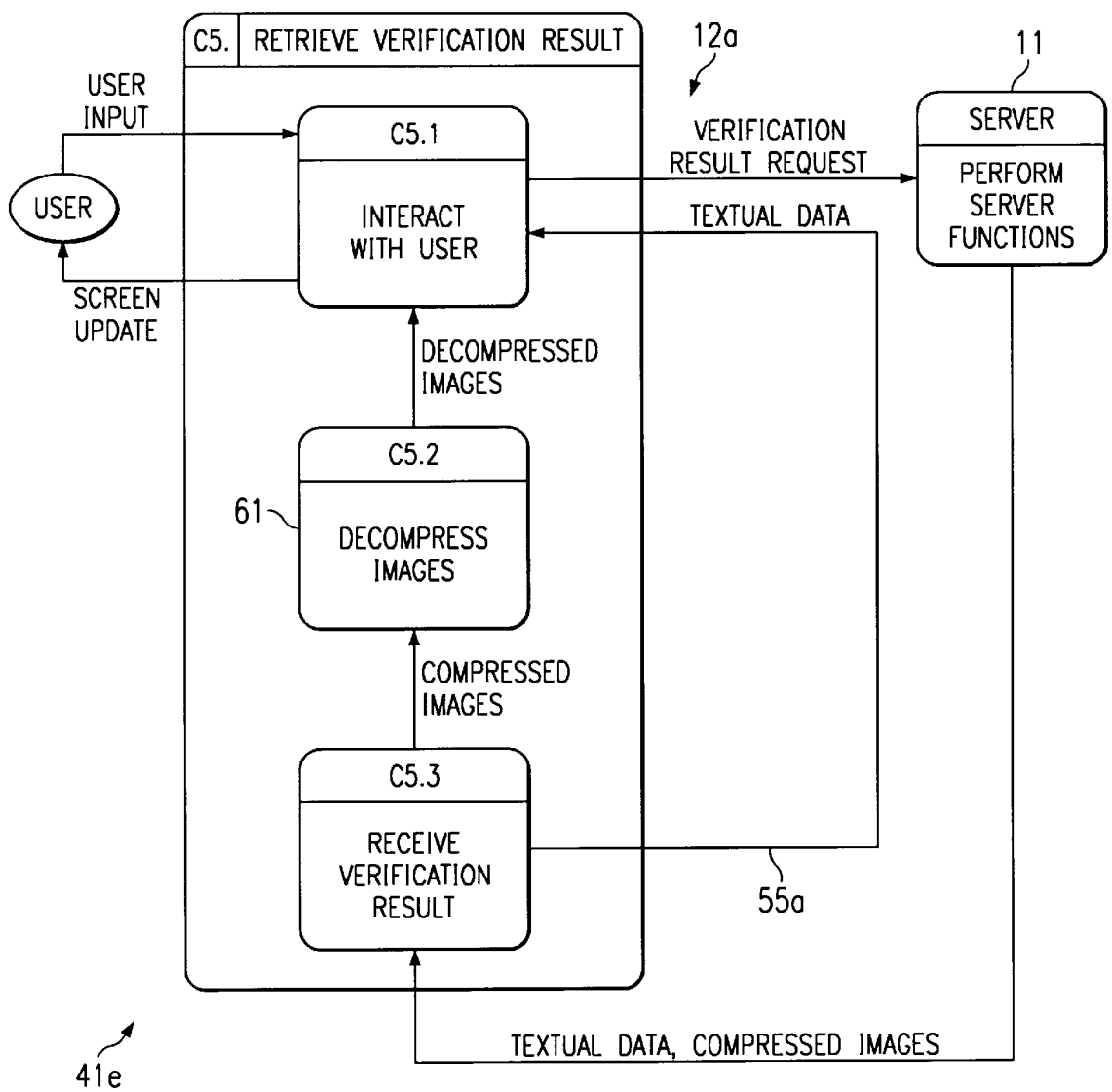
Figure 3H:
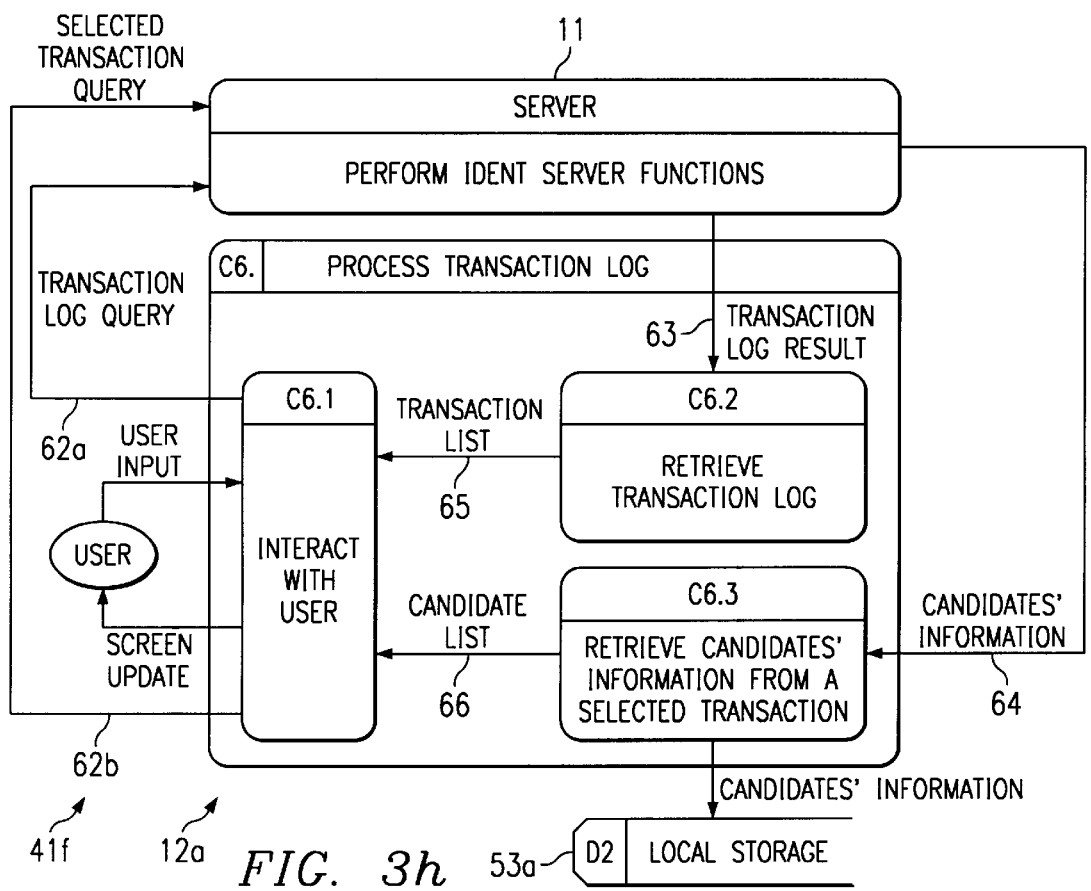
Figure 3I:
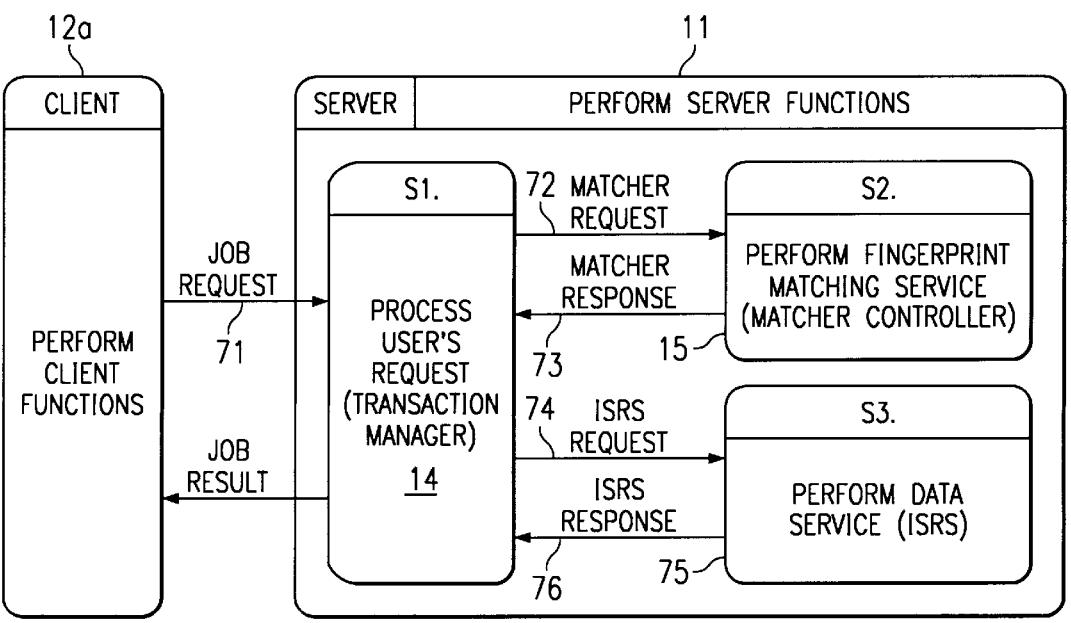
Figure 3J:
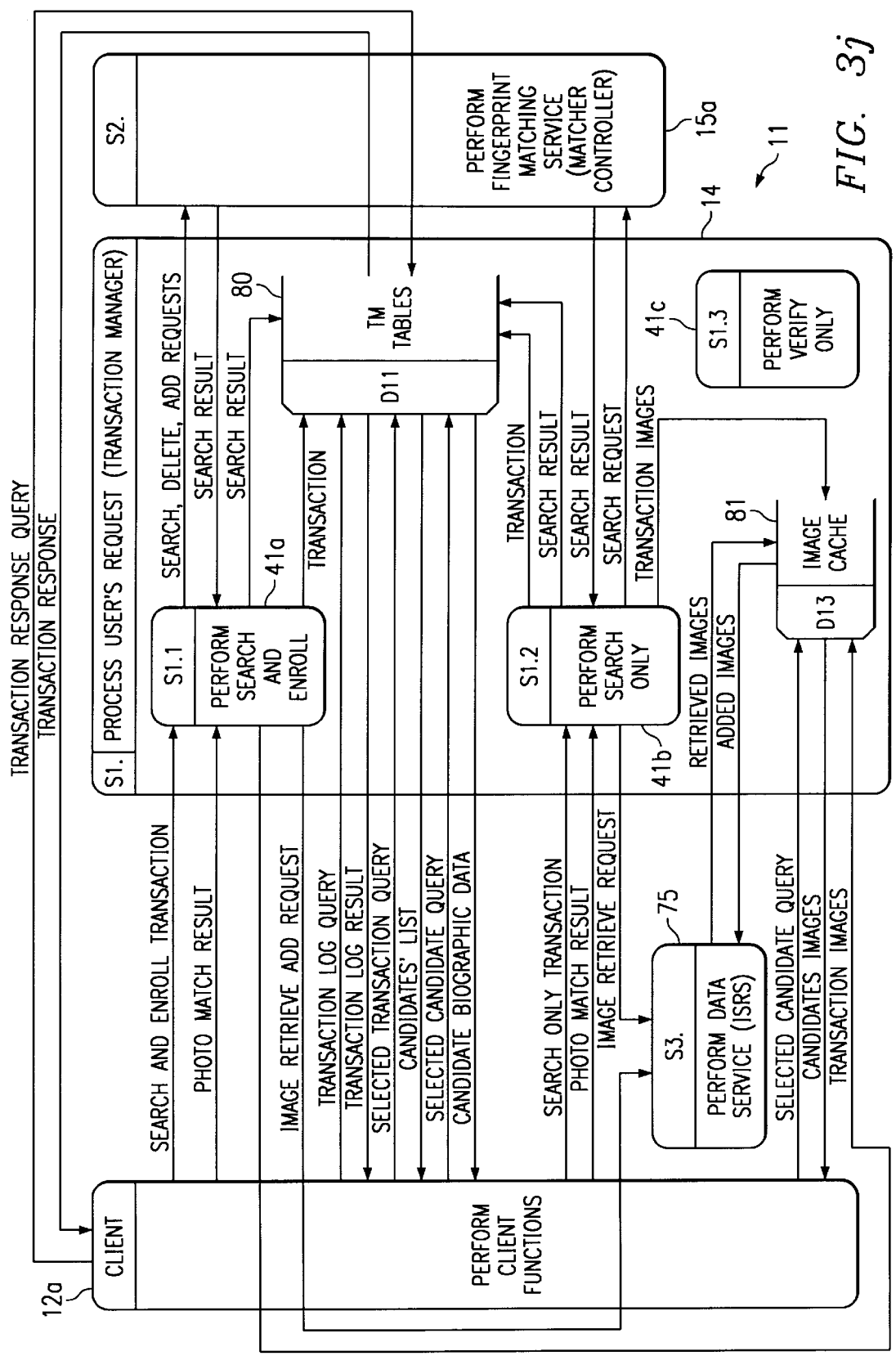
Figure 3K:
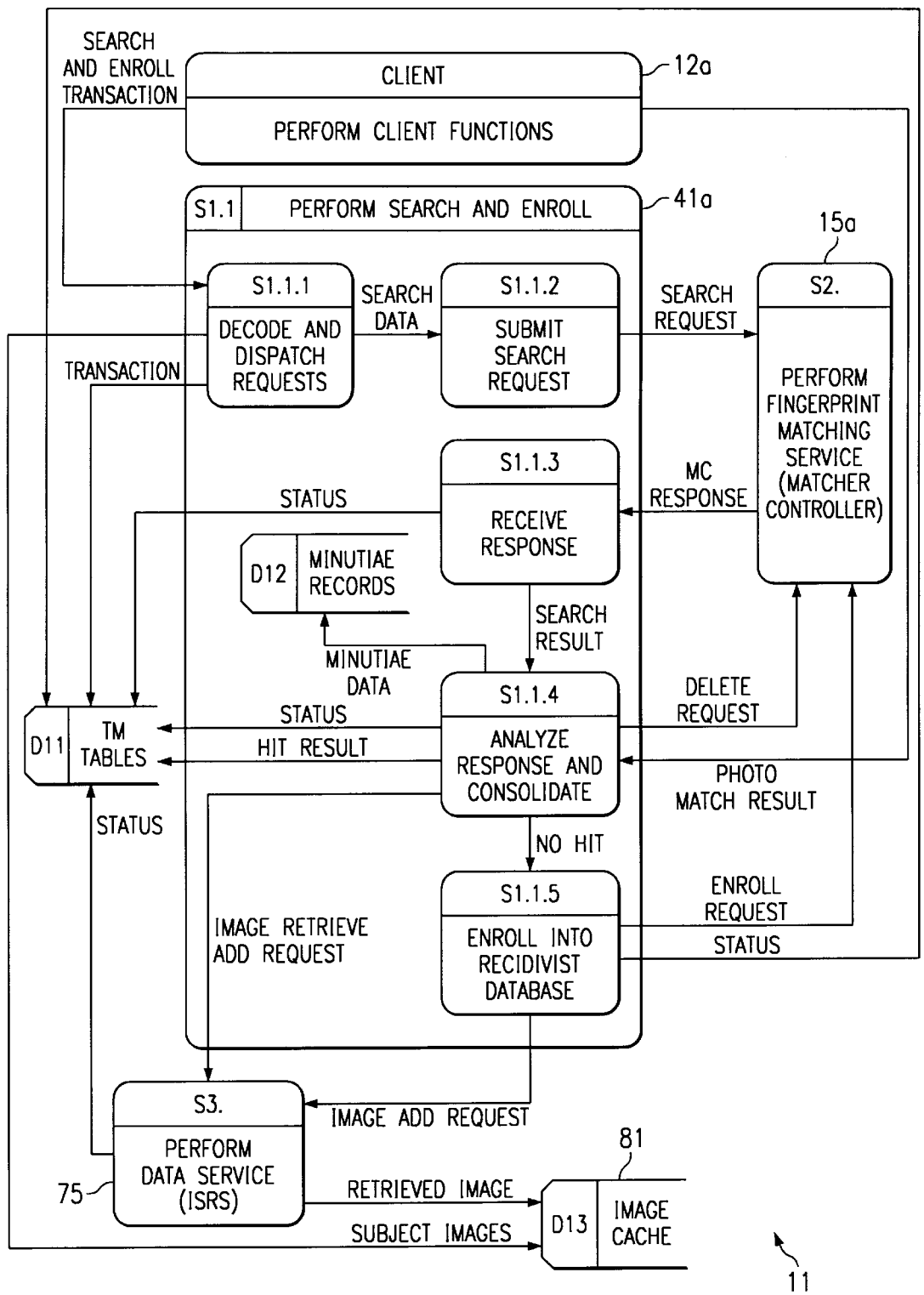
Figure 3L:
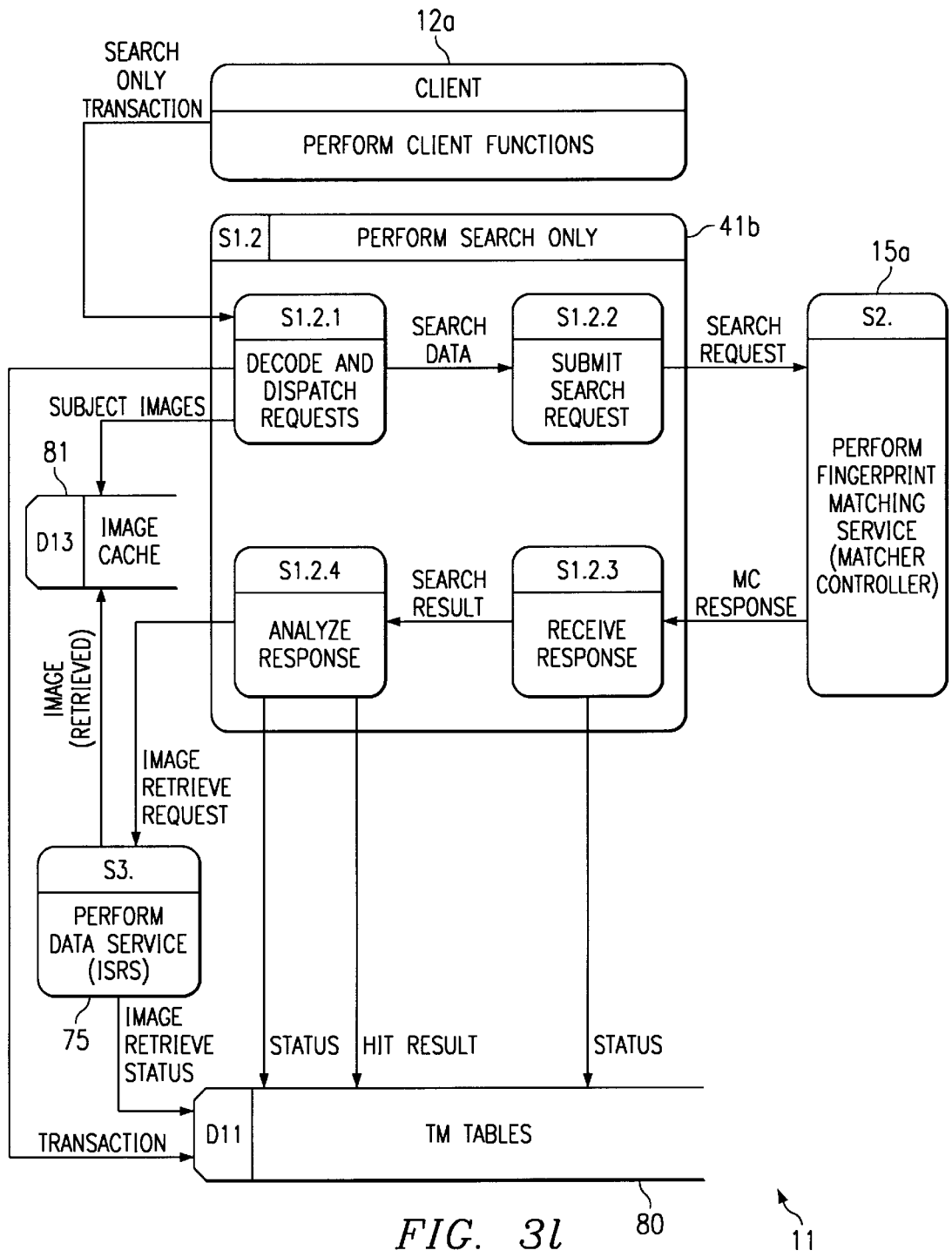
Figure 3M:
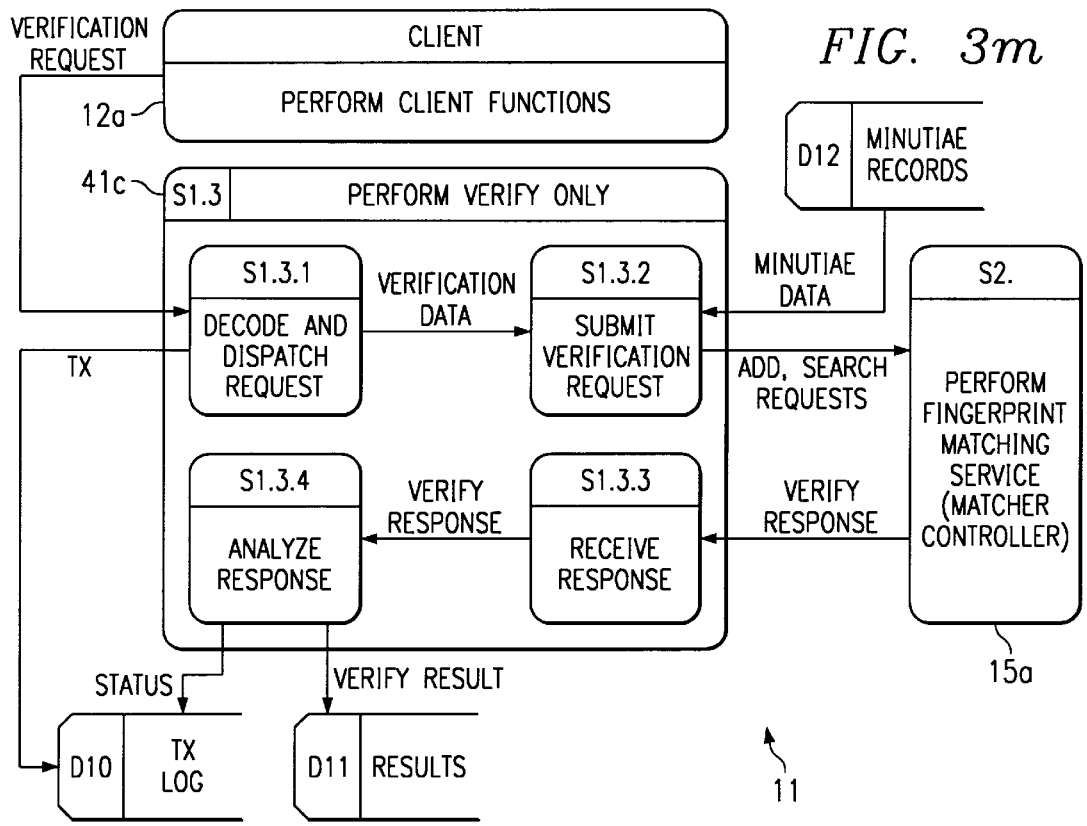
Figure 3N:
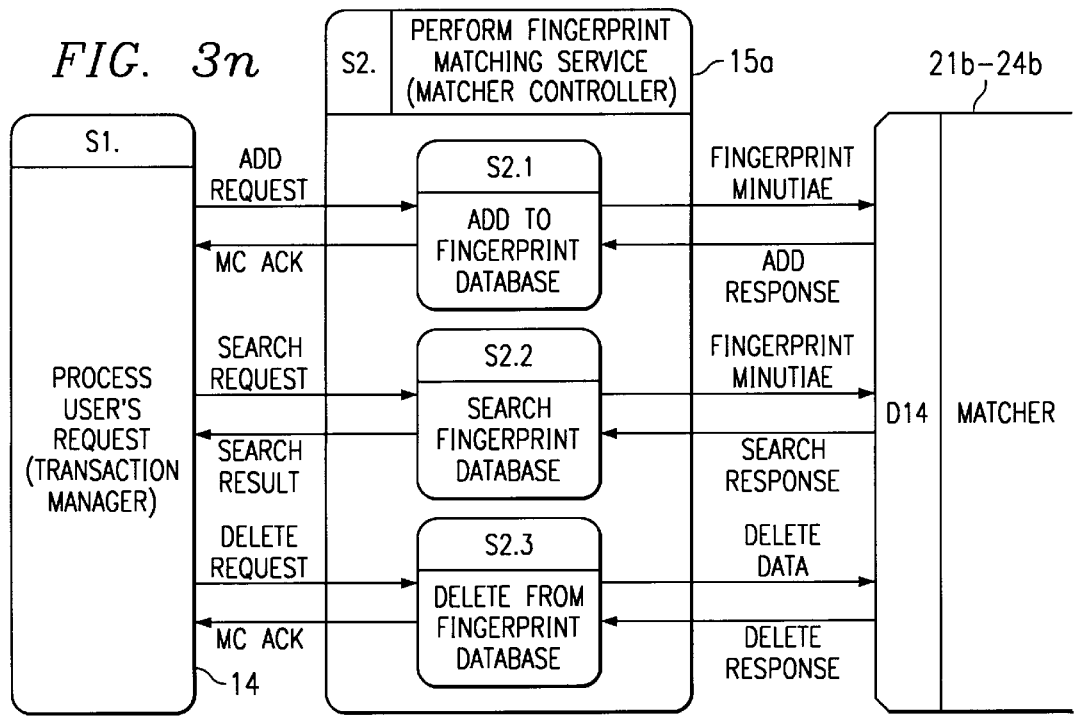
Figure 3O:
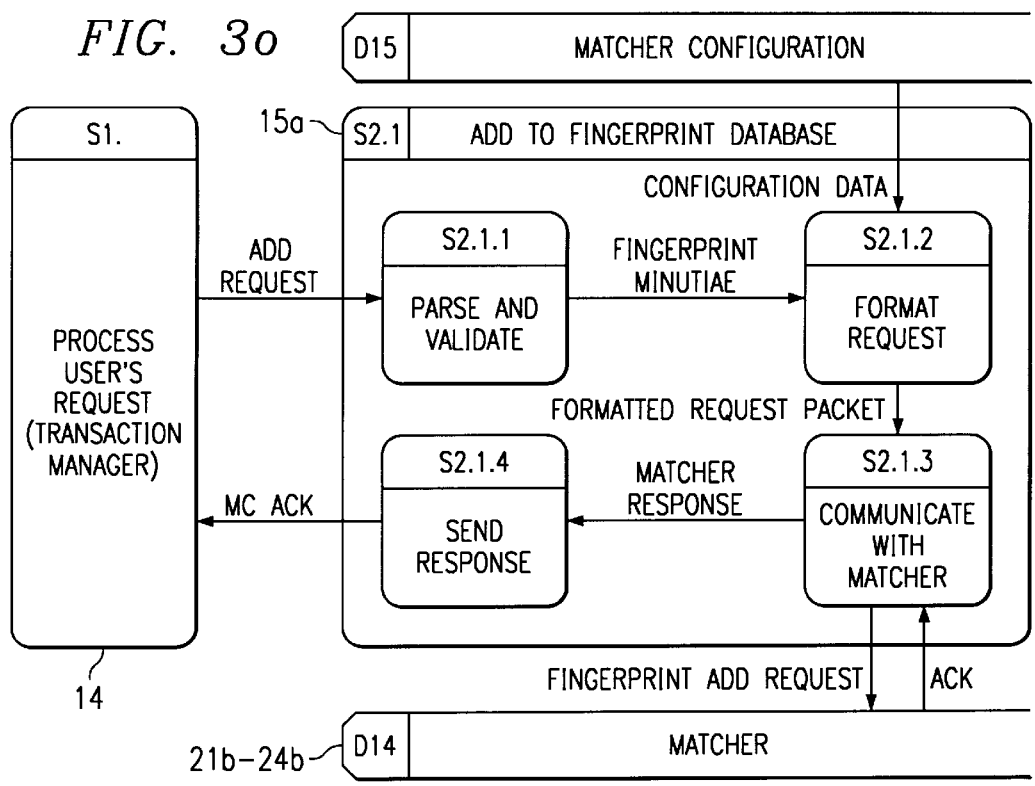
Figure 3P:
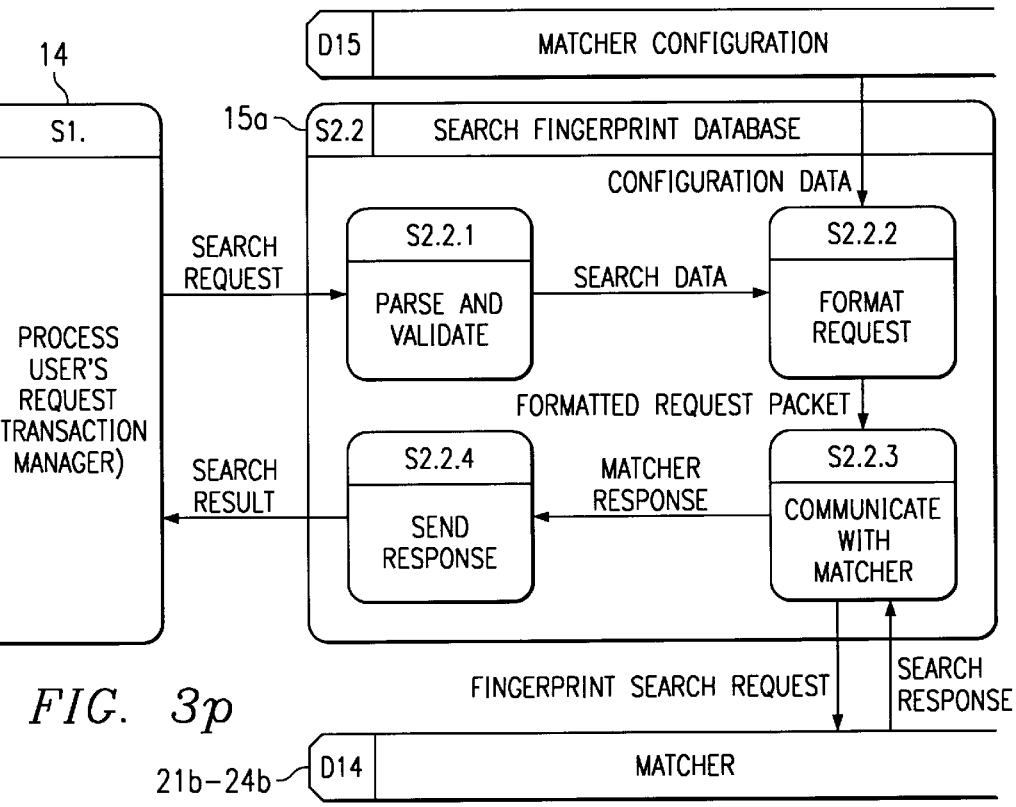
Figure 3Q:
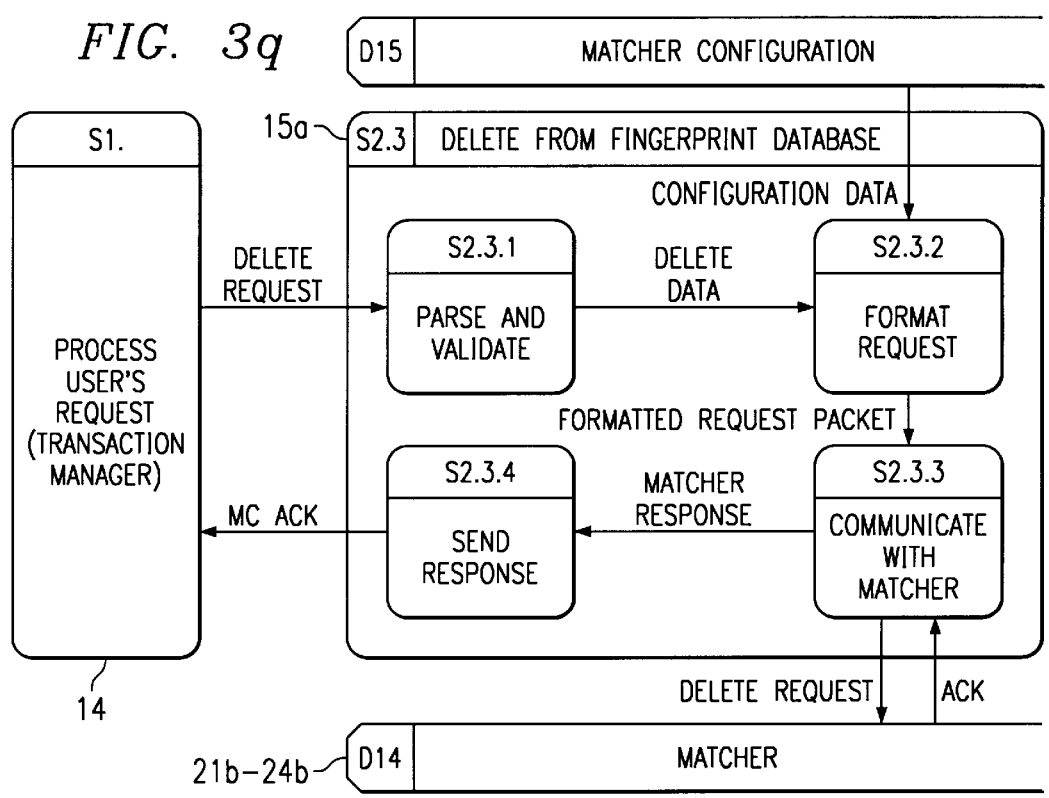
Figure 3R:
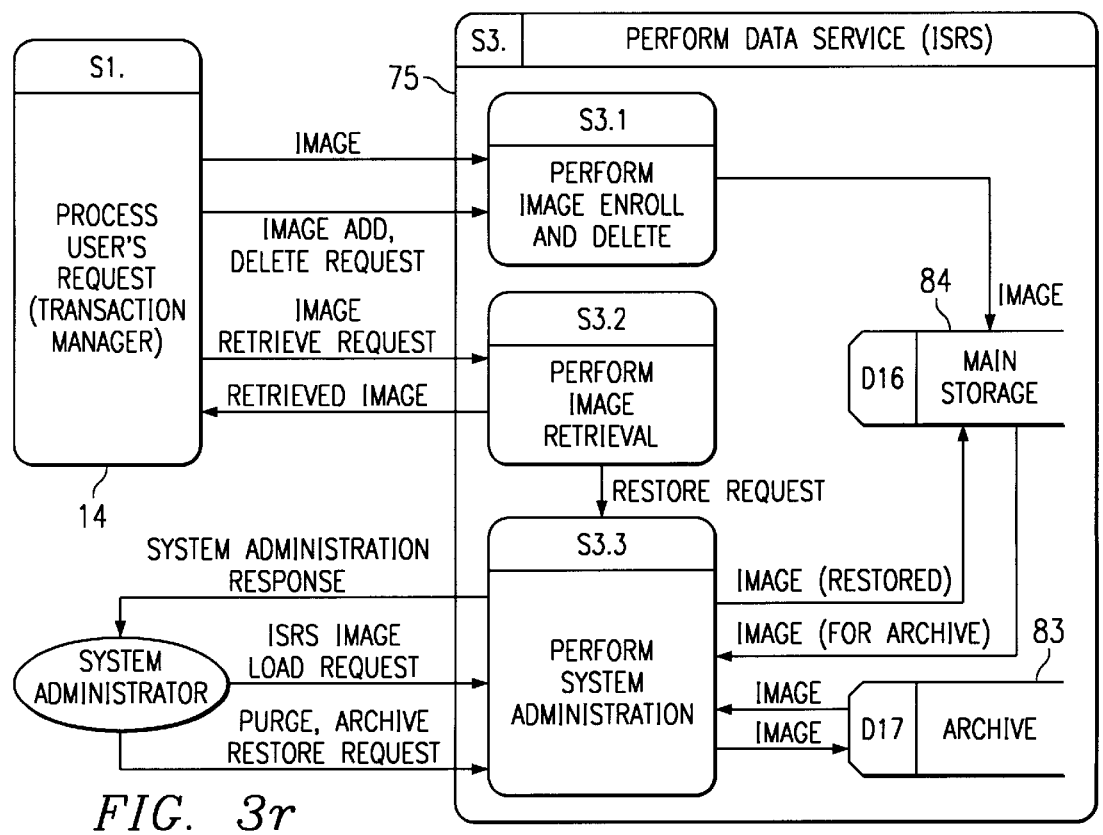
Figure 3S:
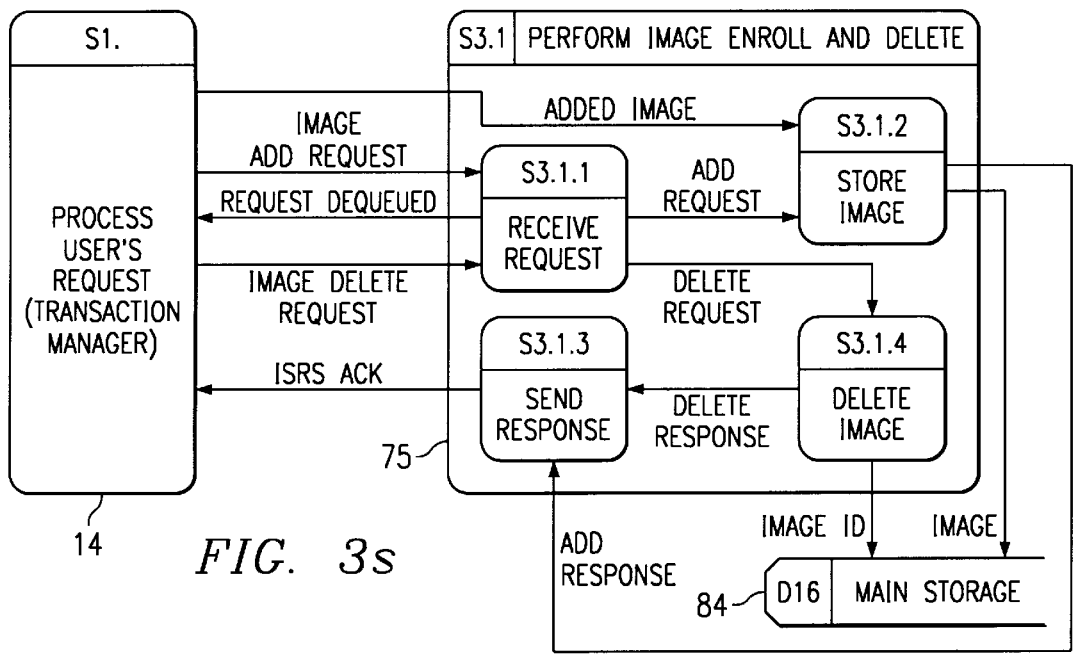
Figure 3T:
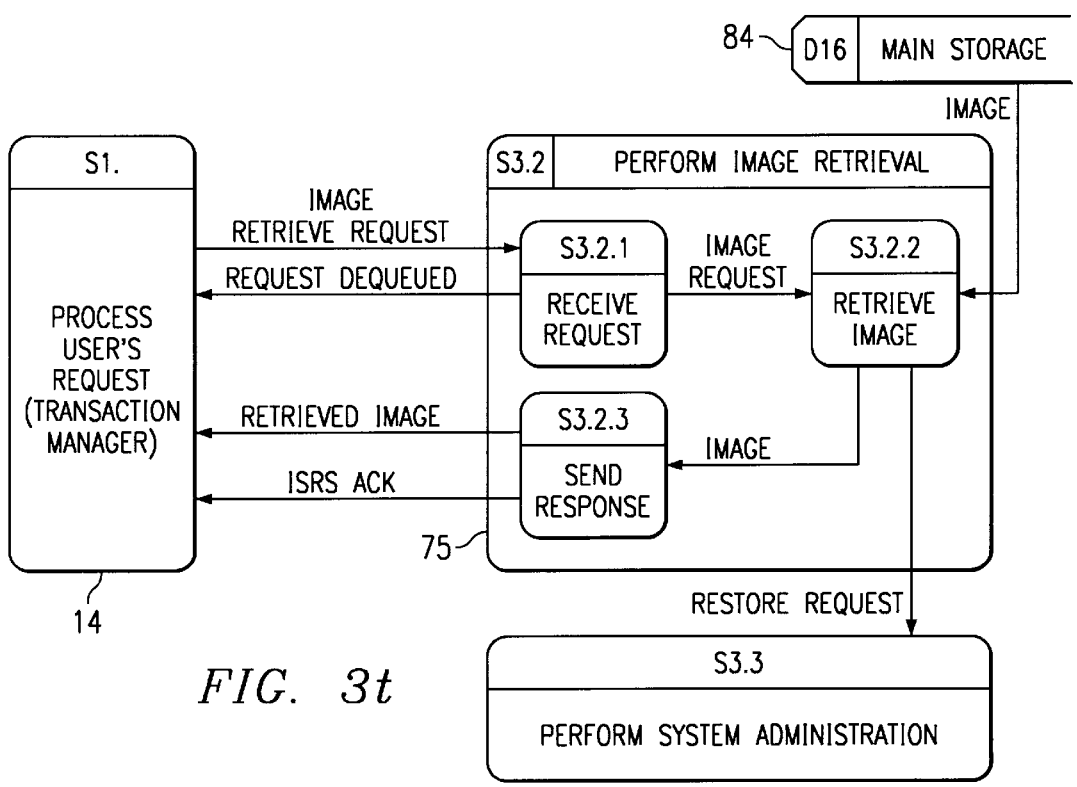

Referring now to FIGS. 3a–3t, they illustrate data flow diagrams representative of the data processing performed in the various subsystems of the distributed biometric identification system 30. A top level data flow diagram illustrative of processing 40 performed by the system 30 is shown in FIG. 3a. In its most simplistic form, a user inputs requests at the client workstation 11. The request is processed by software and/or hardware of the client workstation 12a and the processed request is forwarded to the server 11 which processes the request. Results of processing the request are returned to the client workstation 12a and are displayed to the user.

Referring to FIG. 3b, it shows a top level data flow diagram illustrative of processing performed at the client workstation 12a. Six different procedures 41 or processes 41 may be performed at the client workstation 12a. The first procedure 41 is a search and enroll procedure 41a that searches for or enrolls an individual in the system 30. This procedure 41a involves generating a search and enroll transaction request and a transaction response query which are sent to the server 11. The query is processed at the server 11 and a transaction response is generated by the server 11 and is returned to the client workstation 12a and is displayed to the user.

The second procedure 41 is a search procedure 41b that searches for a candidate individual in the system 30. This procedure 41b involves generating a search transaction request and a transaction response query which are sent to the server 11. The query is processed at the server 11 and a transaction response is generated by the server 11 and is returned to the client workstation 12a and is displayed to the user.

The third procedure 41 is a verify procedure 41c that verifies that an individual is the same individual as the one whose data is stored in the database 20. This procedure 41c involves generating a verify transaction which is sent to the server 11 for processing. The fourth procedure 41 is a display and verify result procedure 41d that sends results of a photograph matching session to the server 11. The fifth procedure 41 is a retrieve verification result procedure 41e that sends a verification result request to the server for processing. The request is processed at the server 11 and a verification result is returned to the client workstation 12a and is displayed to the user.

The sixth procedure 41 is a process transaction log and retrieve information procedure 41f. This procedure involves generating a transaction log query that is sent to the server 11. The transaction log query is processed at the server 11 and a transaction log result is generated. The transaction log result is returned to the client workstation 12a and is displayed to the user. Alternatively, this procedure 41f involves generating a selected transaction query that is sent to the server 11. The selected transaction query is processed at the server 11 and information generated by the server 11 is returned to the client workstation 12a and displayed to the user.

Each of these individual client procedures 41a–41f will be described with reference to FIGS. 3c–3h, respectively. Referring to FIG. 3c, it shows the data flow for the client search and enroll procedure 41a. In the client search and enroll procedure 41a, the user inputs a search and enroll command 51 at the client workstation 12a. Fingerprint images and photographic images of the face associated with an individual are obtained 52 using the digital camera and digital fingerprint camera, for example. The images are locally stored 53 on a local storage device 53a coupled to the client workstation 12a. Relevant textual data is entered 54 by the user into displayed forms used for enrollment purposes, which is also stored on the local storage device 53a. Fingerprint minutiae are then extracted 55 from the stored fingerprint images which are separately stored 56 on a local minutiae storage device 53b. The full fingerprint images and photographic images of the face are then compressed 57 and are stored in a local compressed image storage device 53c. The fingerprint minutiae, compressed images and textual data are then processed along with transaction parameters to generate 58 a search and enroll transaction that is sent to the server 11 for processing. The server 11 performs the requested processing. A transaction response query 59a is then sent to the server 11 which generates a transaction response 59b that is sent to the client workstation 12a which displays the search result to the user.

Referring to FIG. 3d, it shows the data flow for the client search only procedure 41b. In the client search only procedure 41b, the user inputs a search only command 51a at the client workstation 12a. Fingerprint images and photographic images of the face associated with the candidate individual are obtained 52 using the digital camera and digital fingerprint camera. The images are locally stored 53 on the local storage device 53a coupled to the client workstation 12a. Relevant textual data is entered 54 by the user into displayed forms used for search only purposes. The Fingerprint Identification Number(s) (FINS) data is then stored 54a on the local storage device 53a. Fingerprint minutiae are then extracted 55 from the stored fingerprint images which are separately stored on the local minutiae storage device 53b. The full fingerprint images and photographic images of the face are then compressed 57 and are stored in a local compressed image storage device 53c. The fingerprint minutiae, compressed images and FINS data are then processed along with transaction parameters to generate 58 a search only transaction that is sent to the server 11 for processing. The server 11 performs the requested search only processing. A transaction response query 59a is then sent to the server 11 which generates a transaction response 59b that is sent to the client workstation 12a which displays the search result to the user.

Referring to FIG. 3e, it shows the data flow for the client verify only procedure 41c. In the client verify only procedure 41c, the user inputs a verify command 51b at the client workstation 11. Fingerprint images and photographic images of the face of the individual are obtained 52 using the digital camera and digital fingerprint camera, and are digitized by means of a frame grabber 60. The digitized images are locally stored 53 on the local storage device 53a coupled to the client workstation 12a. Relevant textual data is entered 54 by the user into displayed forms used for search only purposes. Fingerprint minutiae are then extracted 55 from the stored fingerprint images which are separately stored on the local minutiae storage device 53b. The fingerprint minutiae, textual data are then processed along with transaction parameters to generate 58b a verify transaction which is sent to the server 11 for processing. The server 11 performs the requested verification processing.

Referring to FIG. 3f, it shows the data flow for the client display and verify result procedure 41d. In the client display and verify result procedure 41d, the user inputs a query at the client workstation 12a which is sent to the local storage device 53a and retrieves the relevant fingerprint and photographic images and associated textual data. The textual data is extracted 55a, the compressed images are decompressed 61 and the textual data and decompressed images are displayed to the user.

Referring to FIG. 3g, it shows the data flow for the client retrieve verification result procedure 41e. In the client retrieve verification result procedure 41e, the user inputs a retrieve verification request at the client workstation 12a which is sent to the server 11 for processing. The server 11 sends the relevant fingerprint and photographic images and associated textual data to the client workstation 12a. The textual data is extracted 55a, the compressed images are decompressed 61 and the textual data and decompressed images are displayed to the user.

Referring to FIG. 3h, it shows the data flow for the client process transaction log procedure 41f. In the client process transaction log procedure 41f, the user inputs either a transaction log query 62a or a selected transaction query 62b at the client workstation 12a which is sent to the server 11 for processing. The server 11 sends the relevant transaction log result 63 along with relevant candidate information 64 to the client workstation 12. A transaction list 65 is generated along with a candidate list 66 that are displayed to the user. The candidate information 64 is stored locally on the local storage device 53a.

Referring to FIG. 3i, it shows a top level data flow diagram illustrative of processing performed at the server 11. A user at a client workstation 12a sends job requests 71 to the server 11 which are processed by the transaction management subsystem 14. The transaction management subsystem 14 issues matcher requests 72 that are sent to the fingerprint matching controller 15a which processes the fingerprint matching requests 72 to generate a matcher response 73. The transaction management subsystem 14 also issues image storage and retrieval subsystem (ISRS) requests 74 which are processed 75 to generate an ISRS response 76. The matcher response 73 and the ISRS response 76 are sent to the client workstation 12a for display to the user.

Referring to FIG. 3j, it shows a data flow diagram illustrative of processing performed by the transaction management subsystem 14. The transaction management subsystem 14 performs search and enroll processing 41a, search only processing 41b, verification only processing 41c and interfaces with the matching controller 15a of the fingerprint matching subsystem 15. In the search and enroll processing 41a, search and enroll transactions are sent from the client workstation 12a to the transaction management subsystem 14 which generates search, delete and add requests that are processed by the fingerprint matching subsystem 15. Search results generated by the fingerprint matching subsystem 15 are processed and added to a transaction table 80 along with the transaction data. The data in the transaction table 80 is accessed by the user when making transaction log queries, selected transaction queries and selected candidate queries. Transaction log results, candidate lists and candidate geographic data are transmitted to the client workstation 12a for display to the user in response to these queries. Similarly, search only transactions and photograph match results generated at the client workstation 12a are processed by the search only procedure 41b which interfaces with the matching controller 15a and with the transaction table 80 to generate search results and transaction log results, candidate lists and candidate geographic data that are transmitted to the client workstation 12a for display to the user. Fingerprint and photographic images are stored in an image cache 81 and are forwarded to the client workstation 12a in response to selected candidate queries.

Referring to FIG. 3k, it shows a data flow diagram illustrative of processing performed using the search and enroll procedure 41a on the server 11. Search and enroll transactions are sent from the client workstation 12 to the server 11 which appropriately identifies and dispatches the requests to the appropriate fingerprint matching subsystem (lookout, recidivism, asylum, benefits). Search request data is processed to generate a search request that is processed by the fingerprint matching subsystem 15. A search response is returned to the server 11 and a search result is generated that comprises one or more stored fingerprint photographs that purportedly match those of the candidate. Results of photographic matching performed at the client workstation 12 are sent to the server 11 and are analyzed (compared) to the stored fingerprint photographs contained in the search response. Fingerprint minutiae are extracted from the retrieved fingerprints and are stored in a local minutiae storage device. If the candidate fingerprint or fingerprints match those obtained in the search, a match result is stored in the transaction table 80. If no match is found, then the candidate is enrolled into the recidivist database 22a. Image retrieval or add requests are processed 75 by the image storage and retrieval subsystem which stores the retrieved image and candidate image in an image cache 81.

Referring to FIG. 3l, it shows a data flow diagram illustrative of processing performed using the search only procedure 41b on the server 11. Search only transactions are sent from the client workstation 12a to the server 11 which appropriately identifies and dispatches the requests to the appropriate fingerprint matcher subsystem. Search only request data is processed to generate a search request that is processed by the fingerprint matching subsystem 15. A search response is returned to the server 11 and a search result is generated that comprises one or more stored fingerprints that purportedly match those of the candidate. Results of photographic matching performed at the client workstation 12 are sent to the server 11 and are analyzed. If the candidate fingerprint match those obtained in the search, a match result is stored in the transaction table. Image retrieval requests are processed by the ISRS 75 which stores the retrieved image and candidate image in the image cache. The candidate images are also stored in the image cache 81.

Referring to FIG. 3m, it shows a data flow diagram illustrative of processing performed by the verify only procedure 41c on the server 11. A verification request is sent from the client workstation 12a to the server 11 which appropriately decodes and dispatches the requests. The verification request is processed to generate search or add requests that are processed by the fingerprint matching subsystem 15. A verify response is returned to the server 11 and a verify result is generated that comprises a stored fingerprint that purportedly matches those of the candidate. Results of photographic matching performed at the server 11 and are generated. Fingerprint minutiae are retrieved from the local minutiae storage device and are used to perform the fingerprint matching performed by the fingerprint matching subsystem 15. A transaction log entry is generated.

Referring to FIG. 3n, it shows a data flow diagram illustrative of processing performed by the matching controller 15a of the fingerprint matching subsystem 15. Add, search and delete requests generated by the user at the client workstation 12a are processed by the transaction management subsystem 14 and sent to the matching controller 15a of the fingerprint matching subsystem 15. The matching controller 15a processes the relevant request to add a fingerprint to one of the fingerprint databases 21a–24a, search the fingerprint databases 21a–24a, or delete a fingerprint from the fingerprint databases 21a–24a. Fingerprint minutiae are sent to the appropriate fingerprint matching engine 21b–24b (lookout, recidivism, asylum, benefits) based on the identification made by the transaction manager which generates an appropriate add, search or delete response which is returned to the matching controller 15a. The matching controller 15a generates an acknowledgment (ACK) signal or search result that is sent to the transaction management subsystem 14 which sends the appropriate signal or search result to the client workstation 12a for display to the user.

Referring to FIG. 3o, it shows a data flow diagram illustrative of processing performed by the matching controller 15a to add a fingerprint to one of the fingerprint databases 21a–24a. An add fingerprint request including the candidate fingerprint minutiae sent from the transaction management subsystem 14 is processed to parse and validate the fingerprint minutiae. The fingerprint minutiae is formatted in accordance with the appropriate formatting scheme of the matching engine 21b–24b, and is sent to the fingerprint matching engine 21b–24b. The matching engine 21b–24b then adds the fingerprint minutiae to the fingerprint database 21b–24b coupled thereto. An acknowledgment signal is generated once the fingerprint is added to the database 21b–24b which is returned as a matcher response to the transaction management subsystem 14.

Referring to FIG. 3p, it shows a data flow diagram illustrative of processing performed by the matching controller 15a to search one of the fingerprint database 21b–24b. A search request including the candidate fingerprint minutiae sent from the transaction management subsystem 14 is processed to parse and validate the fingerprint minutiae. The fingerprint minutiae is formatted in accordance with the appropriate formatting scheme of the fingerprint matching engine 21b–24b, and it sent to the fingerprint matching engine 21b–24b. The fingerprint matcher then searches the fingerprint database 21b–24b coupled thereto. An search response is generated which is returned as a search result to the transaction management subsystem 14.

Referring to FIG. 3q, it shows a data flow diagram illustrative of processing performed by the matching controller 15a to delete a fingerprint to the fingerprint database 21b–24b. A delete fingerprint request including the candidate fingerprint minutiae sent from the transaction management subsystem 14 is processed to parse and validate the fingerprint minutiae. The fingerprint minutiae is formatted in accordance with the appropriate formatting scheme of the fingerprint matching engine 21b–24b, and is sent to the fingerprint matching engine 21b–24b. The fingerprint matcher then deletes the fingerprint from the fingerprint database 21b–24b coupled thereto. An acknowledgment signal is generated once the fingerprint is deleted from the database 21b–24b which is returned as a matcher response to the transaction management subsystem 14.

Referring to FIG. 3r, it shows a data flow diagram illustrative of processing performed by the Image Storage and Retrieval Subsystem (ISRS) 75. The transaction management subsystem 14 sends an image along with an add or delete image request to the ISRS 75. The image that is to be added is sent to the fingerprint database 21b–24b for storage therein, while an image that is to be deleted is found in the fingerprint database 21b–24b and is deleted. Image retrieval requests sent from the transaction management subsystem 14 are processed to restore or retrieve the image from the fingerprint database 21b–24b. The retrieved image is sent to the transaction management subsystem 14 which forwards it to the client workstation 12a. The retrieved image may also be stored in and retrieved from an archive 83. A system administrator has the ability to perform system administration which includes archiving, purging and restoring images to and from the archive 83.

Referring to FIG. 3s, it shows a data flow diagram illustrative of processing performed by the ISRS 75 to enroll and delete a candidate from the fingerprint database 21b–24b. The transaction management subsystem 14 processes a user's request to add or delete an image from the fingerprint database 21b–24b. If a fingerprint is to be added to the fingerprint database 21b–24b, the fingerprint image and the add request are processed to store the image in a main storage device 84. Once the image is added to the fingerprint database 21b–24b, an add response is generated and an acknowledgment signal is sent to the transaction management subsystem 14. If a fingerprint is to be deleted from the fingerprint database 21b–24b, the delete request is processed to delete the image in the fingerprint database 21b–24b. A delete response is generated and an acknowledgment signal is sent to the transaction management subsystem 14.

Referring to FIG. 3t, it shows a data flow diagram illustrative of processing performed by the ISRS 75 to retrieve an image of a candidate fingerprint from the fingerprint database 21b–24b. The transaction management subsystem 14 processes a user's request to retrieve the image from the fingerprint database 21b–24b. The fingerprint is retrieved from the fingerprint database 21b–24b, and an acknowledgment signal is sent to the transaction management subsystem 14. System administration functions may also be performed on the retrieved image in response to a restore request. The system administration functions include loading images into the fingerprint database 21b–24b, archiving images from the fingerprint database 21b–24b into the archive, restoring an archived image from the archive to the fingerprint database 21b–24b, and purging images from the fingerprint database 21b–24b.

By way of example, in operation, to register an individual with the system 30, an applicant database 21b–24b is accessed, and the individual's demographic data are stored. A unique identifier, or identification number is generated, and is transferred to the client workstation 12a. The fingerprints of the left and right index fingers of the individual are scanned, and his/her photograph is taken. The fingerprint matching software on the client workstation 12a extracts the relevant minutiae data and uses this data for searching the fingerprint database 21b–24b for a match. If no match is found, the fingerprints and the photograph are stored in the database 21b–24b, indexed using the identification number. If a match is found, the stored photograph of the individual is displayed to the user for verification. If the user determines that the found match is the same individual, the identification number of the found record is returned so that the newly obtained demographic information can be merged with the information previously stored for this applicant. The workstation then compares the quality of the stored fingerprints with the newly scanned fingerprints, and stores those having the best quality.

To certify the existence of an individual in the database 21b–24b, this function is performed when an individual states that he/she has previously applied for a benefit. The individual's identification number is retrieved from the database 21b–24b, based on the demographic information supplied by the applicant. The individual's fingerprints are scanned. The identification number is then used to retrieve the stored fingerprints for this individual from the database 21b–24b, and a match of the stored and the newly-scanned fingerprints is performed. If the two sets of fingerprints are found to match, any new demographic data are sent to the client workstation 12a. The quality of the stored and newly-scanned fingerprints are compared, and the higher quality prints are stored back into the database 21b–24b. If the two sets of fingerprints do not match, then an open search is conducted, as described in the preceding paragraph. Information obtained from the database 21b–24b is merged, as required, with the fingerprint and photograph images for display or printing.

Thus, a distributed biometric, fingerprint- and photograph-based, identification system for identifying individuals has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A distributed biometric identification system for identifying individuals, comprising:

a plurality of client workstations;

a server remotely located from the client workstations comprising:

a transaction management subsystem;

a fingerprint database for storing fingerprint minutiae of individuals of interest to users of the system;

a matching controller subsystem having a benefit matching subsystem and interfacing with the transaction management subsystem and the fingerprint database for matching fingerprints of individuals to fingerprints stored in the fingerprint database, wherein the benefit matching subsystem comprises a server that searches and verifies individuals in the benefits database and verifies the identification of an individual encountered during the processing; and an image storage and retrieval subsystem for storing and retrieving compressed fingerprint images and photographic images of individuals; and a fiber distributed data interface ring interconnecting the client workstations to the server;

wherein the client workstations and the server cooperate to compare fingerprints of an individual against previously obtained fingerprints stored in the fingerprint database, and to store, update, and retrieve fingerprints and photographic images associated with the individuals previously stored in the image storage and retrieval subsystem for comparison with fingerprint data and a photograph taken of the individual.

2. A distributed biometric identification system for identifying individuals, comprising:

a plurality of client workstations;

a server remotely located from the client workstations comprising:

a transaction management subsystem;

a fingerprint database for storing fingerprint minutiae of individuals of interest to users of the system;

a matching controller subsystem having a benefit matching subsystem, a recidivist matching subsystem, a lookout matching subsystem, and an asylum matching subsystem and interfacing with the transaction management subsystem and the fingerprint database for matching fingerprints of individuals to fingerprints stored in the fingerprint database;

an image storage and retrieval subsystem for storing and retrieving compressed fingerprint images and photographic images of individuals; and a communications network interconnecting the client workstations to the server;

wherein the client workstations and the server cooperate to compare fingerprints of an individual against previously obtained fingerprints stored in the fingerprint database, and to store, update, and retrieve fingerprints and photographic images associated with the individuals previously stored in the image storage and retrieval subsystem for comparison with fingerprint data and a photograph taken of the individual.

3. The system of claim 2 wherein the recidivist matching subsystem comprises a matching engine that enables users to search a recidivist database.

4. The system of claim 2 wherein the lookout matching subsystem comprises a matching engine to search and identify individuals in a lookout database and provides the capability to identify encountered individuals with criminal records.

5. The system of claim 2 wherein the asylum matching subsystem comprises an asylum matching engine that searches and verifies individuals in an asylum database to identify individuals encountered during an asylum application process to effectively detect and reduce immigration fraud.

6. A distributed biometric identification system for identifying individuals, comprising:

a plurality of client workstations;

a server remotely located from the client workstations comprising:

a transaction management subsystem;

a fingerprint database for storing fingerprint minutiae of individuals of interest to users of the system;

a matching controller subsystem having a benefit matching subsystem and interfacing with the transaction management subsystem and the fingerprint database for matching fingerprints of individuals to fingerprints stored in the fingerprint database;

an image storage and retrieval subsystem interfacing with the transaction management subsystem for storing and retrieving compressed fingerprint images and photographic images of individuals; and a fiber distributed data interface ring interconnecting the client workstations to the server;

wherein the client workstations and the server cooperate to compare fingerprints of an individual against previously obtained fingerprints stored in the fingerprint database, and to store, update, and retrieve fingerprints and photographic images associated with the individuals previously stored in the image storage and retrieval subsystem.

* * * * *